Jan. 20, 1959   E. B. HALES   2,870,429
AUTOMATIC PROGRAM CONTROL SYSTEM
Filed March 27, 1951   11 Sheets-Sheet 2
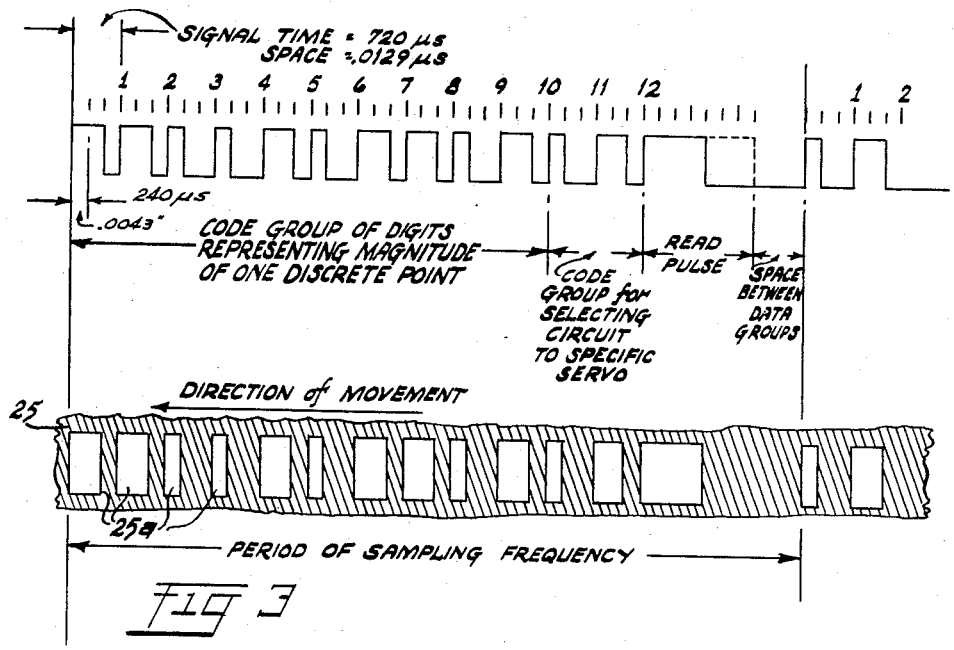
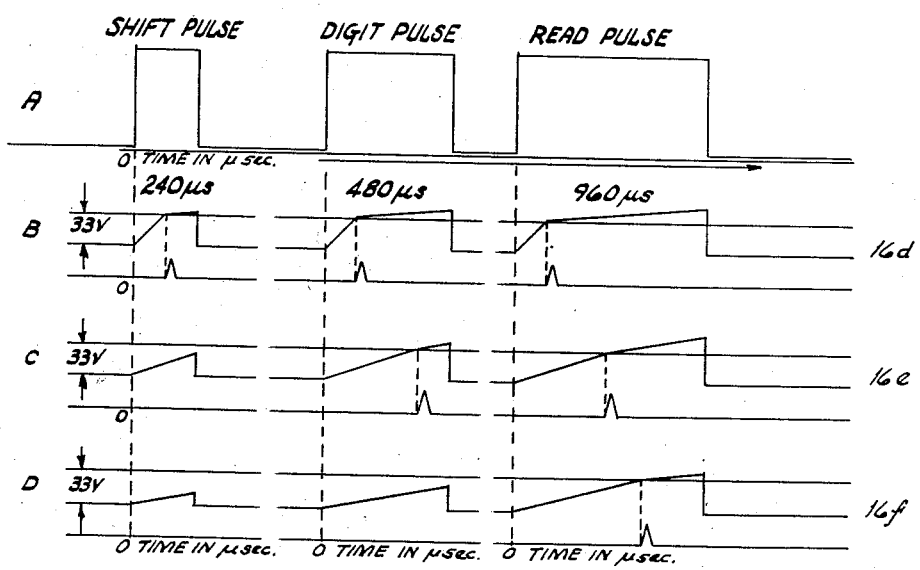
Inventor
EVERETT B. HALES
By
H. A. Mackey
Attorney Jan. 20, 1959 E. B. HALES 2,870,429
AUTOMATIC PROGRAM CONTROL SYSTEM
Filed March 27, 1951 11 Sheets-Sheet 3

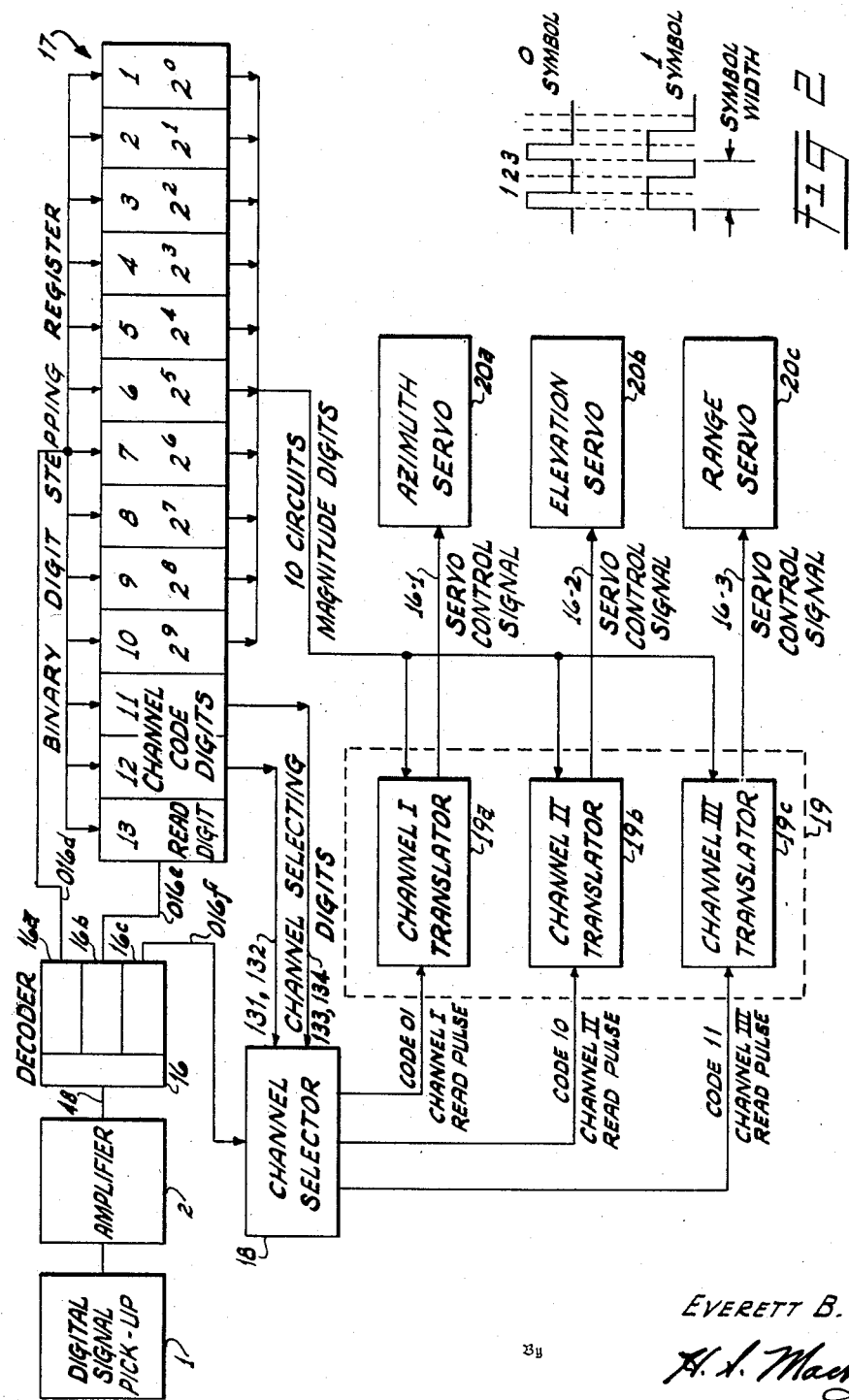

COMPLETE 3
FRAME SECTION
OF FILM

Inventor
EVERETT B. HALES
By
H. L. Mackey
Attorney

Jan. 20, 1959  E. B. HALES  2,870,429
AUTOMATIC PROGRAM CONTROL SYSTEM
Filed March 27, 1951  11 Sheets-Sheet 4
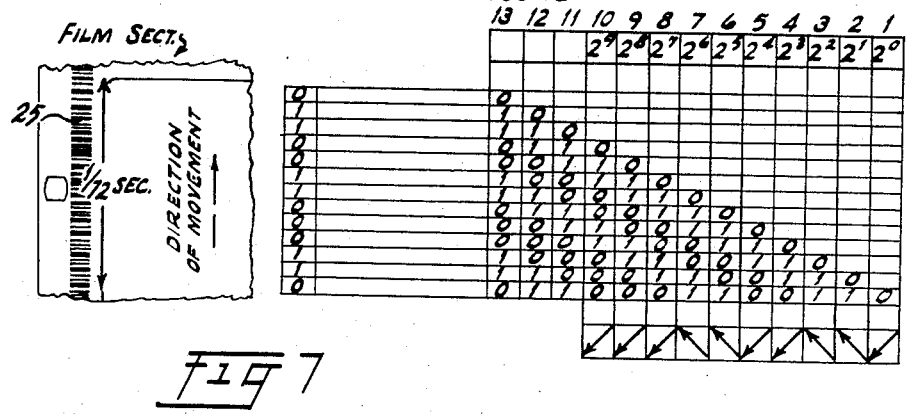
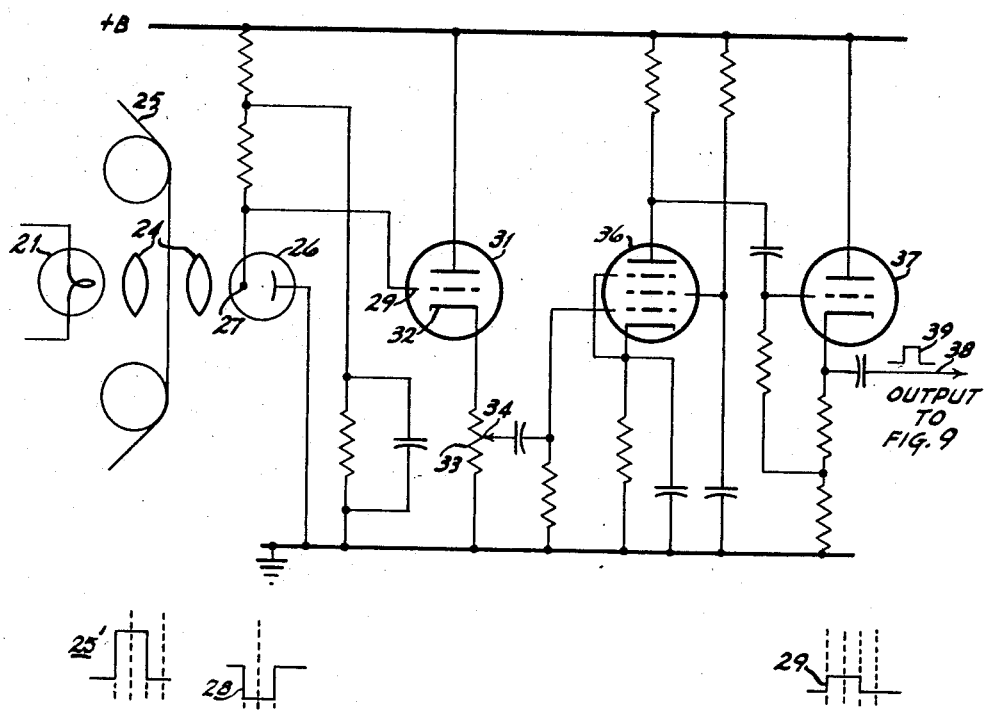
Inventor
EVERETT B. HALES
By
H. S. Mackey
Attorney Jan. 20, 1959 E. B. HALES 2,870,429
AUTOMATIC PROGRAM CONTROL SYSTEM
Filed March 27, 1951 11 Sheets-Sheet 5

Inventor
EVERETT B. HALES
Attorney

Jan. 20, 1959

E. B. HALES 2,870,429

AUTOMATIC PROGRAM CONTROL SYSTEM

Filed March 27, 1951

Inventor
EVERETT B. HALES

H. H. Mackey
Attorney

Jan. 20, 1959  E. B. HALES  2,870,429
AUTOMATIC PROGRAM CONTROL SYSTEM
Filed March 27, 1951  11 Sheets-Sheet 10
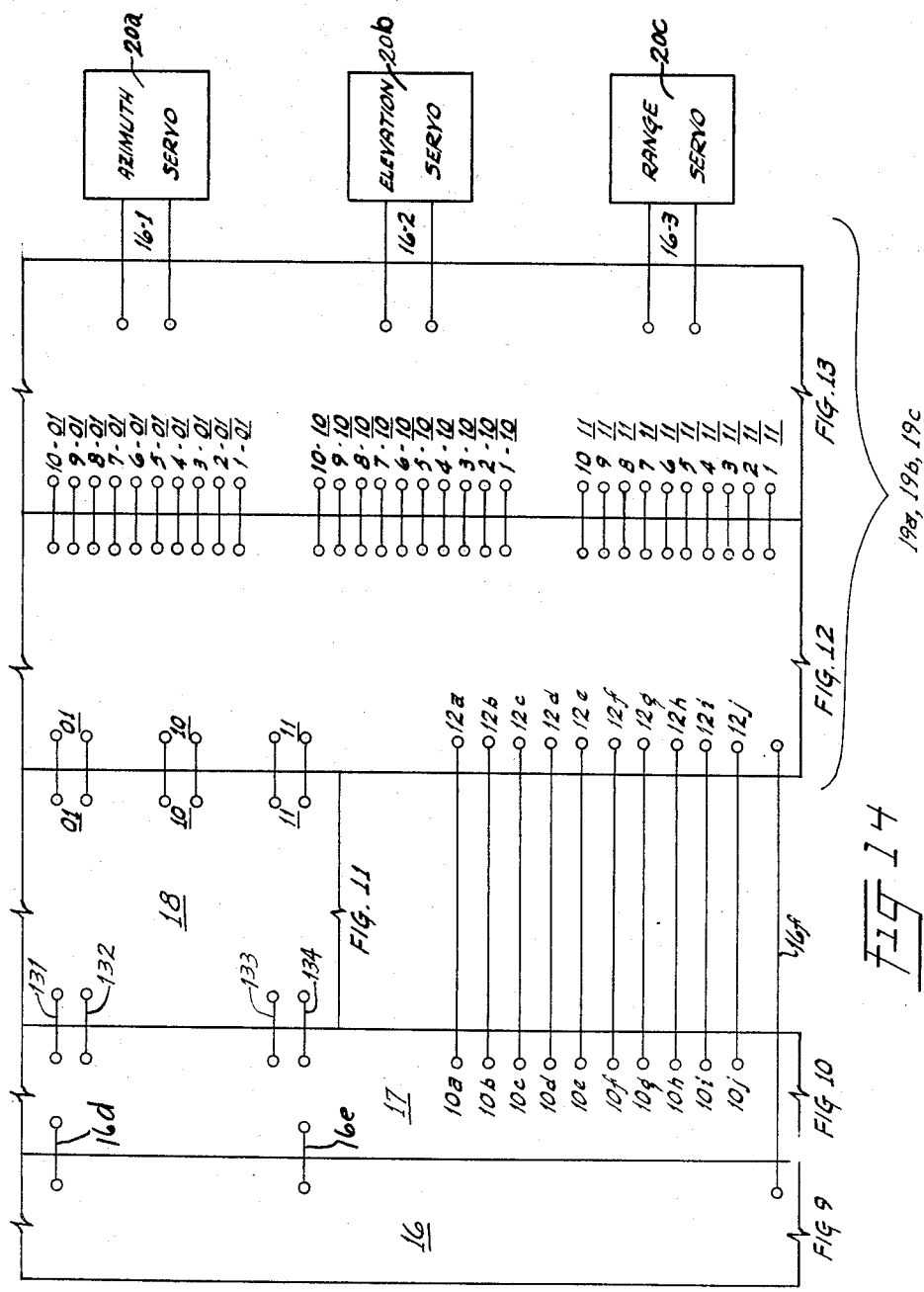
Inventor
EVERETT B. HALES
By H. A. Mackey
Attorney Jan. 20, 1959      E. B. HALES      2,870,429
AUTOMATIC PROGRAM CONTROL SYSTEM
Filed March 27, 1951      11 Sheets-Sheet 11
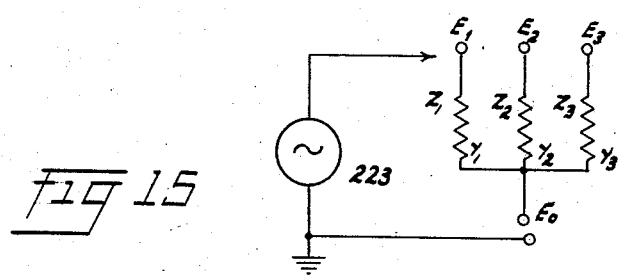
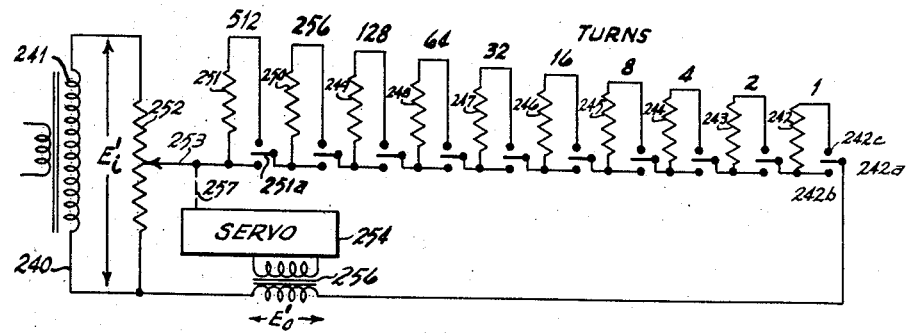
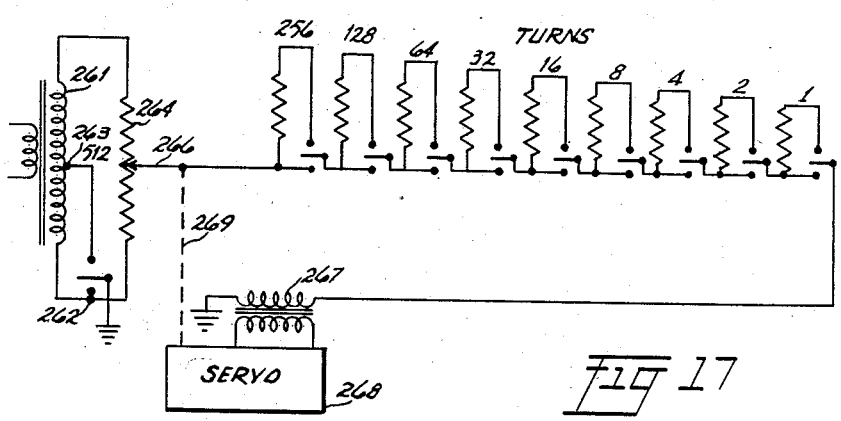
Inventor
EVERETT B. HALES
Attorney

United States Patent Office 2,870,429
Patented Jan. 20, 1959

2,870,429

AUTOMATIC PROGRAM CONTROL SYSTEM

Everett B. Hales, Hawthorne, N. Y., assignor to General Precision Laboratory Incorporated, a corporation of New York Application March 27, 1951, Serial No. 217,821

29 Claims. (Cl. 340—147)

This invention relates to an automatic programming system. According to this invention a program is resolved into independent operations constituting the program, which operations may be expressed as time functions. These time functions may then be translated into operative entities which are functions of the magnitude of discrete points on the time functions. The invention is accordingly particularly directed to a method and apparatus for representing one or more time functions, constituting an operation or operations of a program, in terms of operative entities of preselected characteristics and time relations and for routing and combining these entities in appropriate manner to control final utilization devices in accordance with the individual operations constituting the program. The operative entities may be in the form of electrical signals, variations in fluid pressure and/or velocity, or any other suitable control entities which are capable of being transmitted from one point to another. In this respect, the invention pertains to a telemetering system having special characteristics.

More specifically this invention relates to the art of translating data representing a time function into electrical quantities and using these quantities to operate a utilization device; the invention including an improved method and apparatus for recording data representing a plurality of independent time functions which data are closely associated chronologically and for translating, segregating and distributing said data among independent utilization circuits.

The invention provides a novel method and apparatus for recording and/or translating data representing a plurality of independent variables which are closely associated chronologically, the data representing the independent variables being arranged serially on a moving recording vehicle. The invention is particularly directed to an improved method and apparatus for translating data representing one or more time functions by sampling the functions at discrete time intervals and representing the instantaneous amplitudes of the time functions at these discrete instants of time by discrete quantized values in terms of a digital series. The inventive concept contemplates the provision of means for effecting shaft rotation responsive in magnitudes and directions to said time functions.

Digital computers of electronic type are well known in the prior art. These devices are capable of representing numerical analogue values in terms of electrical quantities. Also these devices and certain systems using certain components of these digital computers in appropriate combination are capable of performing certain operations on numbers such as multiplication and division in response to certain signals which are sequentially fed into the computer.

However, heretofore, many problems have arisen where it is desirable to translate a continuous time function into a suitable record which should later be translated into electrical quantities such as current or voltage which vary quantitively in accordance with the time function. Particularly difficult problems have arisen where it is desired to translate this continuously varying time function directly, or through recordation and subsequent translation quantitively into mechanical movements such as the rotation of shafts or the operation of mechanical controls in the proper chronological sequence. In some such prior systems these continuous functions have first been converted to mechanical movements which were then supplied to the input of the computer. In accordance with the present invention, a time function is converted directly into electrical quantities which represent discrete points on the time function in terms of a digital system and then these quantities may be used to produce mechanical movement which varies in accordance with the original time function within limits which can be varied by the design to satisfy the requirements. Also the present invention provides a system in which a plurality of time functions which are closely associated chronologically can be utilized to control independent mechanical movements which quantitively and relatively bear the same relation chronologically as the controlling time functions themselves. If desired, these independent variables may be recorded on a single recording medium so that the quantized symbols will always maintain their proper relation so that when they are later translated into representative electrical quantities or mechanical movements they will have the desired chronological relation. Accordingly, a primary object of the invention is to convert a continuously variable time function into operative entities which are represented by digital code signals.

Another object is to provide a time function translator which is capable of representing a time function in readily utilizable mechanical movements such as the rotation of a shaft.

Another object is to provide a system capable of representing a plurality of independent variables which are closely associated chronologically in terms of analogue signals, such as electrical quantities or mechanical movements, in which the respective signals will have quantitively the same relative chronological association as those of the independent variables.

A still further object is to provide a system of the type generally described above in which a plurality of series of digital code signals are utilized to represent, respectively, discrete points on each of a plurality of variables which can be recorded on recording medium in such manner that the symbols can be later translated to produce analogue signals which vary in accordance with the respective time functions.

A still further object is to provide a system of the type generally described above in which decoding equipment is reduced to minimum simplicity and in which the equipment is economical of bandwidth without appreciable sacrifices of operating efficiency.

Other and still further objects are readily apparent from the following description when considered with the accompanying drawings in which:

Figure 1 is a schematic diagram of the system of the present invention.

Figure 2 is an enlarged representation of the symbols used to represent the zero and unit binary digits.

Figure 3 is an enlarged representation of a portion of a recording medium, such as a conventional motion picture film, on which is recorded symbols representing the binary digits, a scale being provided along the section of the film to indicate the relative length of the electrical pulses corresponding to the digit symbols.

Figure 4 is a representation of a sequence of pulses indicating their general shape and amplitude to indicate how the different circuits discriminate against the different types of pulses used in the binary system.

Figure 7 illustrates the relation between the sequence of presentation of the recorded symbols before the decoder and the time sequence of the final electrical conditions set up in the binary register corresponding to the binary symbols on the recording medium, the positions of the arrows representing the final states of respective electrical circuits, the combined effect of which represents one discrete point on a time function.

Figure 8 is a circuit diagram of the soundhead and audio amplifier.

Figure 9:
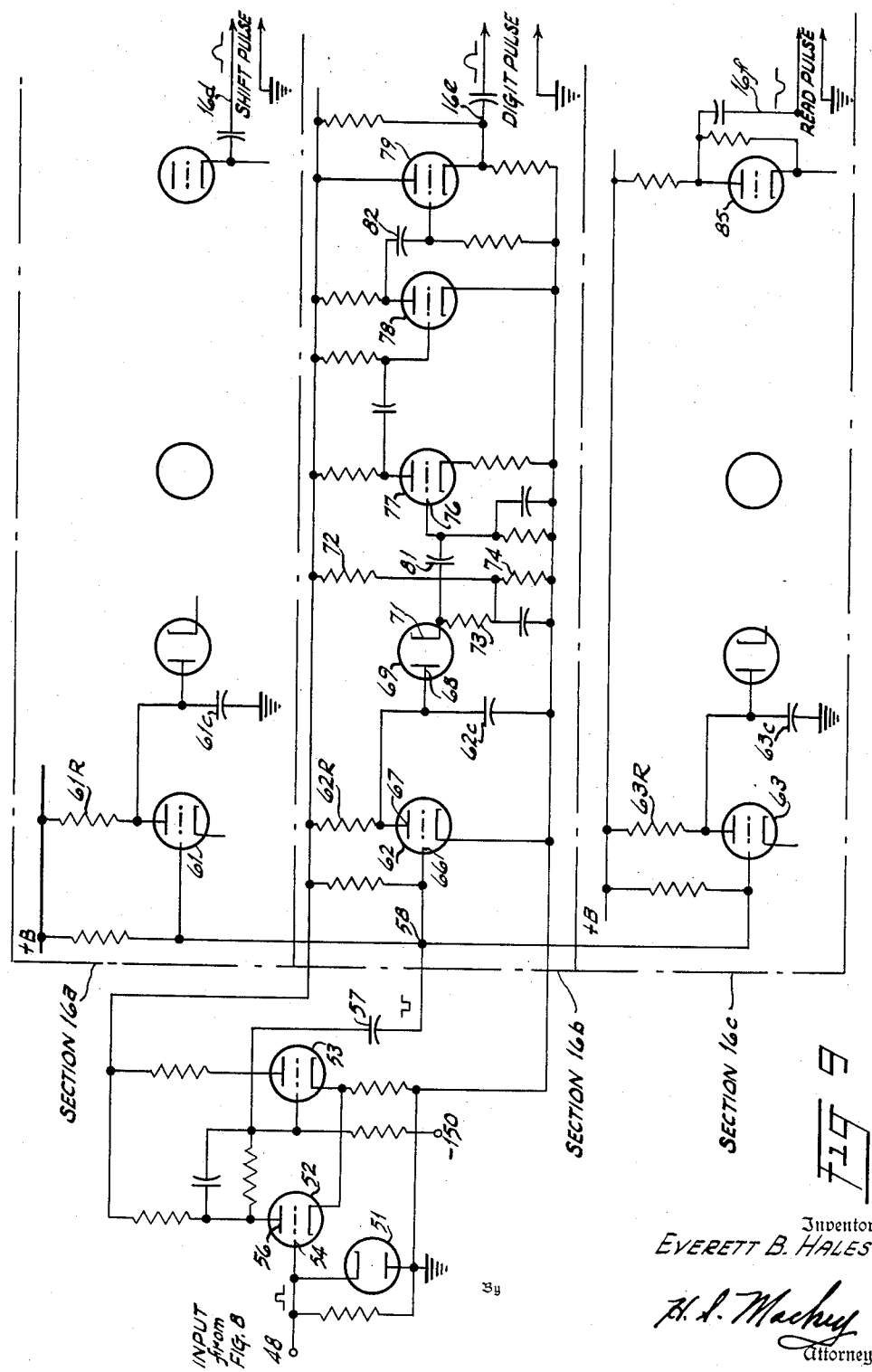

Figure 9 is a circuit diagram of the decoder.

Figure 10:
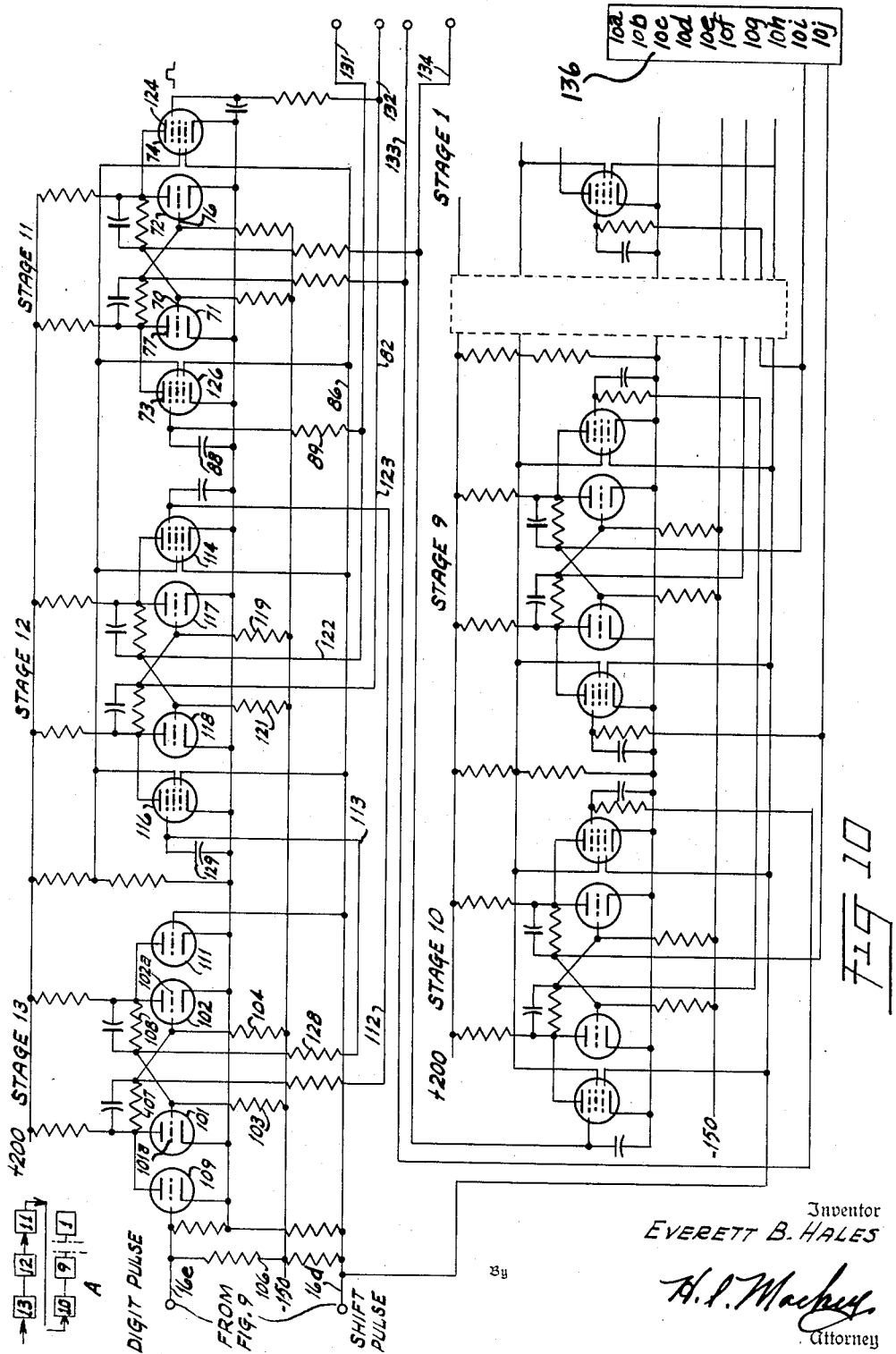

Figure 10 is a circuit diagram of the digital register.

Figure 11:
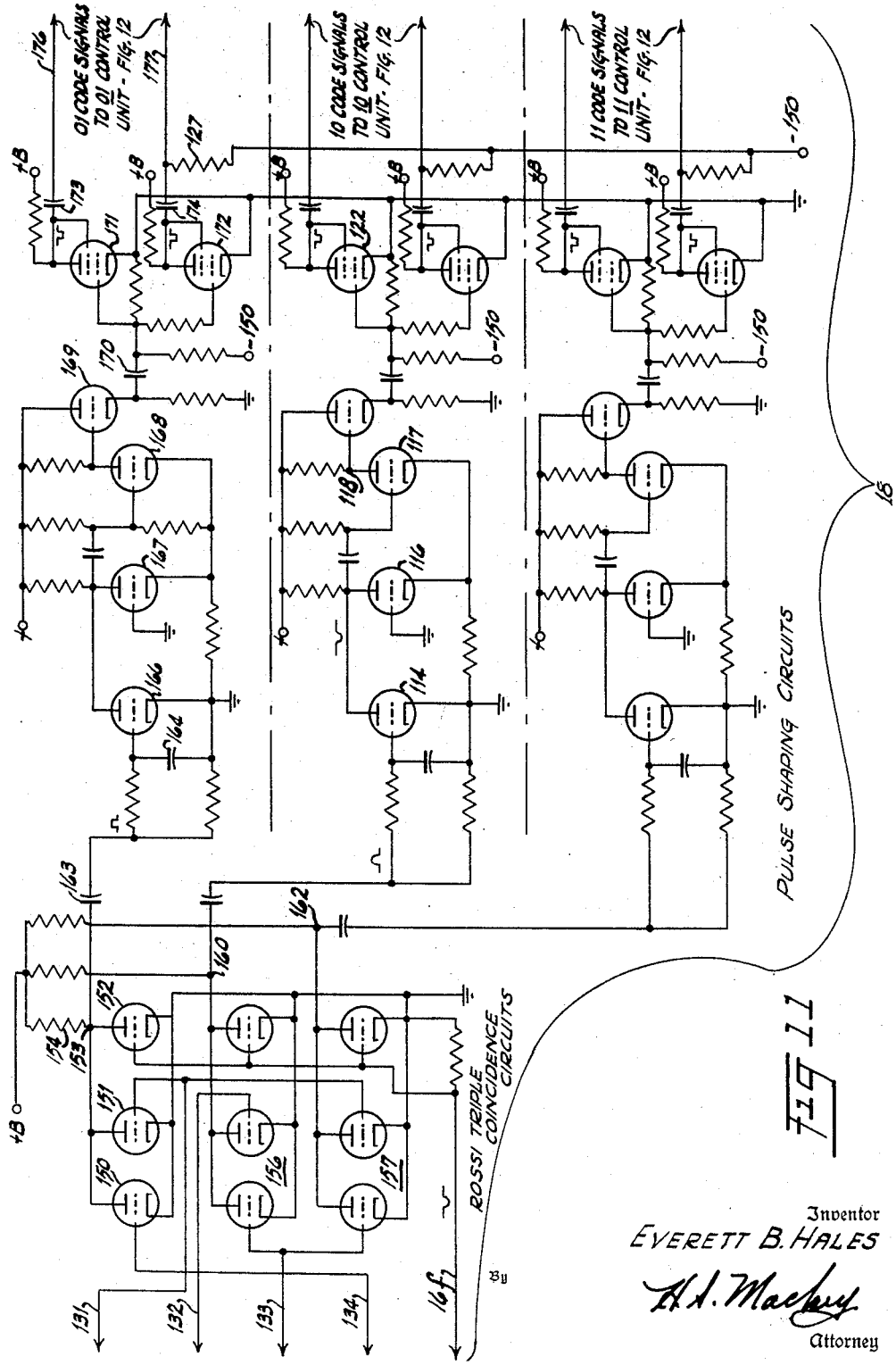

Figure 11 is a circuit diagram of the channel selector.

Figure 12:
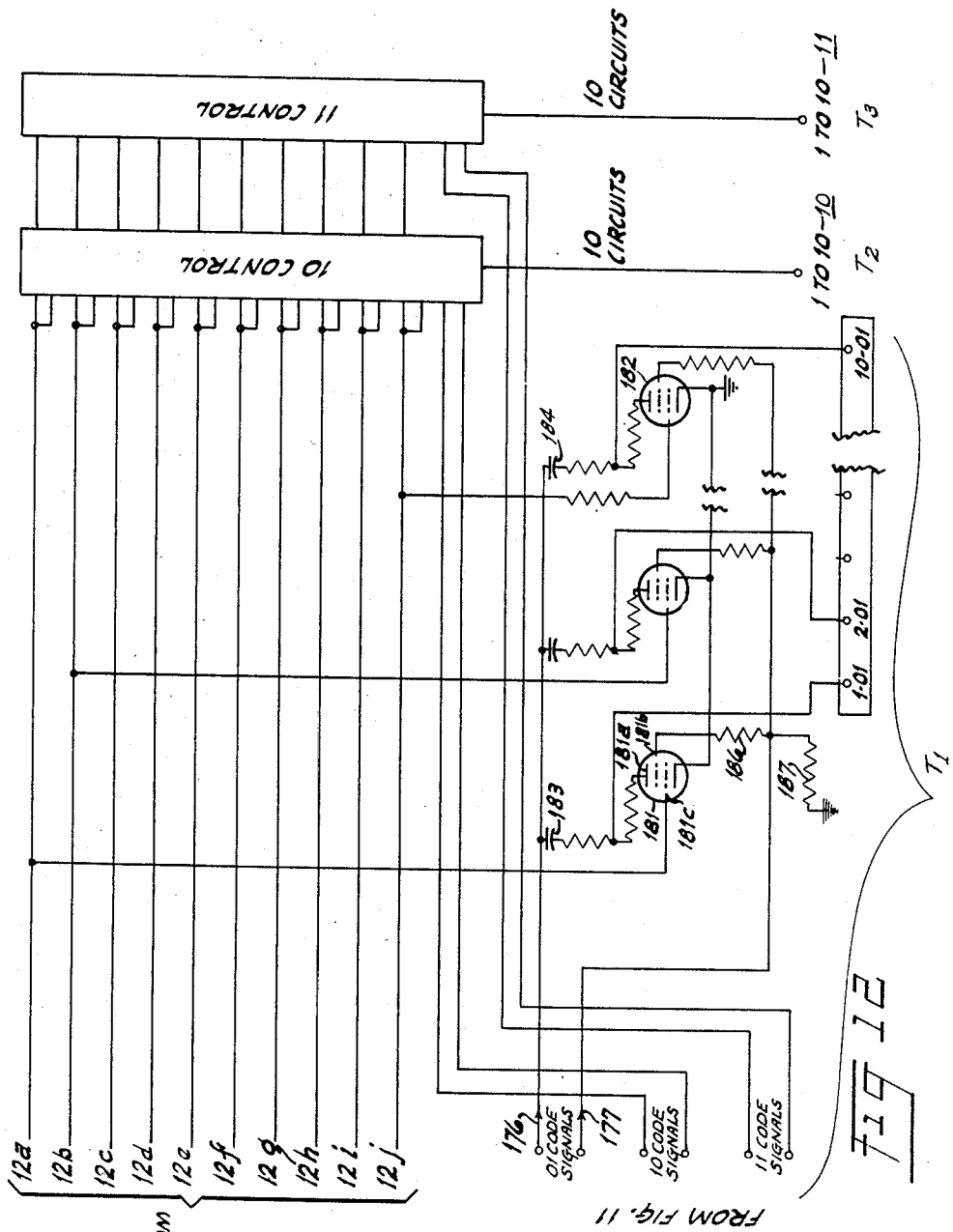

Figure 12 is a circuit diagram of one component of the channel translator, namely, the relay control component.

Figure 13 is a circuit diagram of another component of the channel translator, namely, the component which translates the digital number into a proportional output electrical quantity, such as a voltage.

Figure 14 shows the relative positioning of the circuit diagrams of Figs. 9 to 13, inclusive, to show the complete circuit diagram of the channel selector and the subsequent units.

Figure 15 illustrates the manner in which the operation of the relays adds the impedances in the proper order to produce the output electrical quantity.

Figures 16 and 17 show modified forms of the invention shown in Fig. 13.

At the outset it is desired to state that the inventive concept has a wide application and that there are numerous electrical and/or mechanical equivalents of the specific components which are represented in the system which has been chosen for the purpose of illustrating this invention. The invention is illustrated in connection with a system which may be used for training gun crews but it will be immediately obvious that portions of the specific system shown could also be used for controlling various mechanical movements in accordance with any known data. In the basic concept of the invention it is not essential that the data be recorded before it is applied to the system; in the latter event any single time function or a plurality of time functions could be converted into electrical or mechanical data which could be expressed in a digital system and then be applied to the first basic unit of the system which is the decoder.

In the system chosen for the purpose of illustration certain arbitrary selections have been made for the purpose of clarity and simplicity. A binary digital system has been chosen primarily because the circuitry of such a system is simpler than some of the other types of digital systems which could be used.

Figure 5:
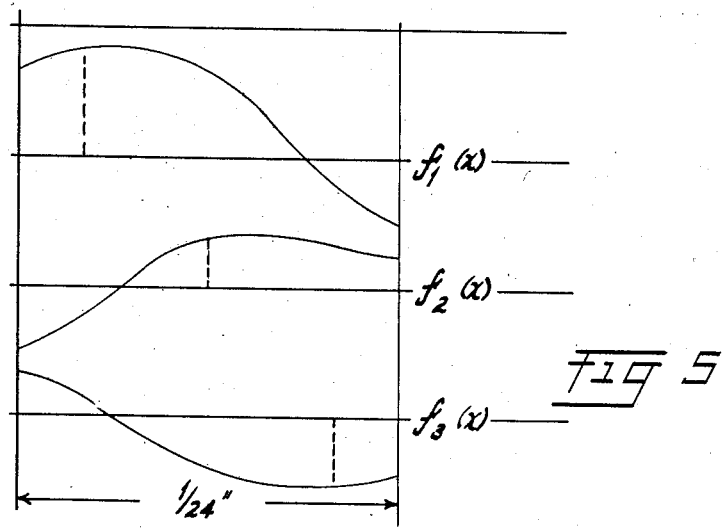
Figure 5 is a graphical representation of three representative time functions which may be recorded serially on the film and represented by the symbols shown in Fig. 3.
Figure 6:
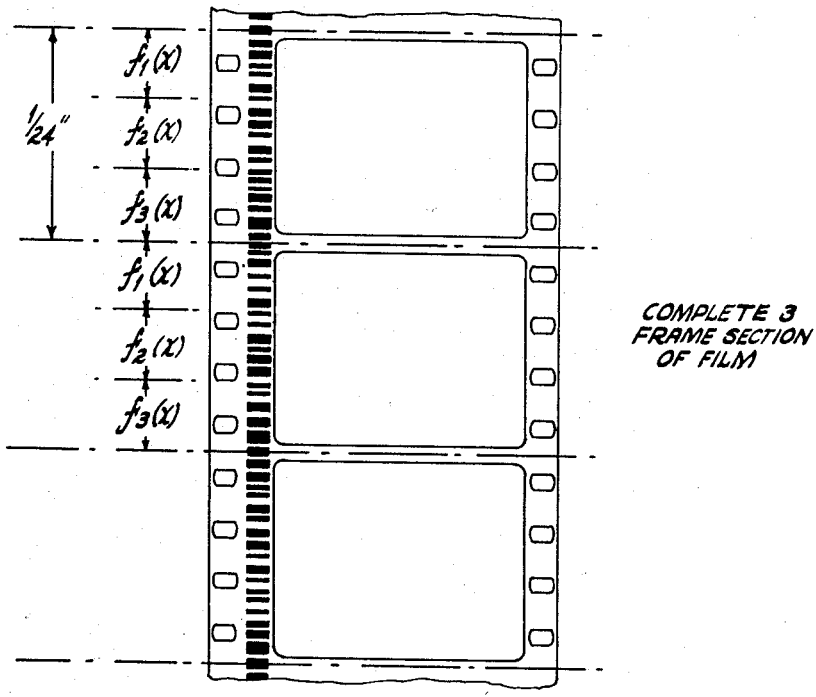
Figure 6 is an enlarged portion of a section of film showing the manner in which a plurality of time functions such as those shown in Fig. 5 may be arranged on a recording film and indicating one possible relation of the binary symbol data with respect to the picture frames which may record physical data or mechanical movements.

The zero and unit digits of a binary system are represented by electrical pulses or signals of different length. These signals are represented graphically on the motion picture film by symbols which are in the form of transverse striations of opaque and transparent areas of varying width. The symbols and signals are based on a three-space system which is clearly shown in Fig. 3, the zero digit being represented by a striation one space wide while a unit digit is represented by a signal two spaces wide. In this way there is always one space between signals representing different digits. A set of these symbols, or code group, represents in the binary digital system the numerical value of a discrete point on a time function. Where there are a plurality of functions represented there may be sets of these symbols representing discrete points on each of the different functions placed serially on the motion picture film so that points on the several functions which are closely related chronologically or chronologically adjacent, will be maintained in the proper relation. Figs. 5 and 6 are illustrative of this arrangement. A subsequent set of points on the different time functions would be represented by succeeding sets of symbols arranged serially on the film as clearly indicated in Fig. 6. As shown in Fig. 6 certain points on the time functions are represented by symbols on the sound track which are opposite successive picture frames.

Following the symbols representing the magnitudes of the discrete points on a function, are symbols which identify the channel or circuit controlling one of the utilization devices.

In addition to the symbols which represent the points on the time functions and their channel identification, there is a third type of symbol the purpose of which is to produce what is termed here a "read" or command pulse. The purpose of the read pulse is to direct the 12 different coding stages of the binary register to read simultaneously what is found in the individual coding stages of the register at the time of the "read" pulse. It will be noted from Fig. 1 that the binary stepping register includes 13 stages; comprising 12 coding stages and one storage stage. Ten of the stages are adapted to store binary digits which indicate numerical values of discrete points on the time functions, and two of the stages are adapted to store pulses which select the channels into which the binary signals are to be directed, the 13th stage being adapted to store the signal associated with the read pulse.

By the very nature of a binary system, that is, the two-state system, one channel, in this case channel 16$d$, supplies the signal to produce a state $S_1$, or zero digit condition, which condition is always shifted to the right by any subsequent signal be it a zero or unit digit signal and stage 13 serves as a storage device for a unit digit which is always ready to be shifted into the chain of 12 coding stages upon receipt of a signal over channel 16$e$. At any one instant the stepping register 17 will contain the last 13 digits which have been supplied to the decoder 16. It will be seen that it is necessary to have three different kinds of symbols recorded on the recording medium. The simplest symbols are rectangular pulses and the means of differentiating between these pulses can depend on pulse amplitude, pulse polarity or pulse duration. Discrimination based on pulse duration has been selected as the preferred embodiment of this invention because it greatly simplifies the system. There are three signal channels from the decoder 16 such as channels 16$d$, 16$e$ and 16$f$ in Fig. 1 from the respective sections. The signal pulses of the shortest duration accepted by any of the channels is approximately 120 microseconds. The time constants of the other two channels are approximately, respectively 360 microseconds and 720 microseconds. The circuit arrangement is such that the signal of shortest duration will produce a pulse through only channel 16$d$ into the stepping register 17 while a signal of 360 microseconds but less than 720 microseconds will produce one pulse over the first channel 16$d$ and one over the second channel 16$e$; and a signal of 720 microseconds or more will produce a signal in all three of the channels.

The sets of data including the three kinds mentioned are placed serially on the sound track adjacent each picture frame so that the digital representation of the three closely adjacent points will be presented chonologically to a computer as the film goes past the soundhead. In other words, a code group appears on the film adjacent each picture frame which includes 10 digits representing the numerical value of one discrete point on the time function, the channel code identification of two digits and the read pulse which orders or directs the register to pass the stored data into the proper translator and thus to the desired utilization channel for operating the preselected servomechanism.

Very briefly, the specific embodiment chosen to illustrate the invention comprises the following major components comprising: (1) a soundhead 1 and its associated amplifier 2, (2) a decoder 16 which translates the audio signals representing the digits and read pulses for selectively operating the stepping register 17 and the channel translator, (3) the stepping register 17 having a plurality of stages which serve as a temporary storage for the binary digits for a channel selector 18 which determines which one of the three output channels is to be energized by the digital signals, (4) the channel selector 18, (5) a translator 19 which converts the digital pulses into electrical signals, and (6) appropriate utilization devices such as the servo units 20a, 20b and 20c which are adapted to be operated individually by the voltages controlled by the different channels which voltages independently represent the different functions.

The detailed description of the various components shown in the block diagram of Fig. 1 will be deferred until each of these components is discussed. However, very briefly, the operation of the system may be described as follows: the two kinds of symbols recorded on the film, briefly referred to above, are utilized to represent the zero digits and the unit digits of a binary number. A total of 10 binary digits is used to represent the magnitude of any given discrete point on one of the time functions. Two additional digits are used to identify the channel. The decoder 16 directs these two kinds of signals into the binary stepping register 17 in such a manner that after the 12 pulses have occurred, the binary register 17 contains indications of the 10 digits of the binary number and the two digits indicating the channel. After these 12 digits have been supplied to the stepping register 17 a third kind of pulse, the read pulse, is presented and the decoder 16 and the channel selector 18 directs this read pulse into the translator 19 so that the appropriate translator reads whatever is found in the binary register 17 at that instant. In other words, the binary register 17 gives out a signal to the proper channel which signal represents one discrete point on one of the time functions. This signal may be applied to an appropriate utilization device to perform any desired function. The translator continues to give out a constant electrical signal until a new reading signal is directed to that channel. Thus with the system the servo units are corrected by a series of electrical pulses each of which is proportional to a discrete point on one of the time functions. It will be readily apparent that the time interval between these pulses could be varied and could be made to approach closer and closer the actual time function as desired. In the system described, the data on the film represents azimuth, elevation, and range data and are presented in the order named.

The principles of the pulse coding by time duration of the present system can best be illustrated by describing the code actually used with this translator. The time relations are represented by the symbols on the sound track of the film as shown in Fig. 3. As previously mentioned, the code symbols are based on a three space system, the zero digit symbol being one space wide and the unit digit symbol being two spaces wide as shown in Fig. 2. These symbols are represented on the film 25 by transparent areas 25a, the narrow transparent areas indicating zero digits and wide transparent areas representing unit digits. In other words, the transparent spaces indicate signals and the opaque portions indicate no signal. The symbols are arranged on the film to have the same total duration so that a code group will have the same length no matter what the relative distribution of zero and unit digits. The read pulse follows each code group of 12 digit symbols and consists of 4 spaces of signal and several spaces of no signal. The purpose of making the read symbol of long duration is to assure that the circuits can perform all of their functions before any new data is presented. It will be noted that since the length of each picture frame presents data representing only one point on each individual time function, the number of picture frames that pass the soundhead per second constitutes the sampling frequency. Obviously, this sampling frequency code can be varied if it is desired to record the function with greater accuracy. It is to be noted that the digit symbols are arranged on the motion picture film in such a relative position that the symbols representing the least significant digits will be presented to the soundhead first.

The order of reading, that is, the order of translation or presentation to the programming system is entirely arbitrary as far as the philosophy of design or operation of the present invention is concerned. The order of digits increasing in significance from right to left is arbitrarily chosen herein in order to minimize the effects of instrument failure in the stepping register 17. The order of presentation can be readily changed by merely changing the order of connection of the wires.

As mentioned above, there is a two to one ratio of width of symbols and this choice has been made arbitrarily in designing the specific system to solve the problem at hand. However, this ratio could be varied so long as the ratio is not reduced to the point where the discriminators cannot adequately separate the pulses representing the different digits.

In the specific system described, the width of the symbols is so related to the speed of the conventional motion picture mechanism so that 20 data frames per second are presented to the soundhead. At this speed the electrical pulses of 240 microseconds duration would correspond to a symbol on the film which is .0043 inch wide.

Referring to Fig. 8, the soundhead 1 and its associated amplifier 2 includes an exciter lamp 21 which through the optical system comprising lens 24 projects an image of the encoded sound track of the film strip 25 upon the photoelectric cell 26. A single pulse of illumination through a transparent striation 25a (Fig. 3) representing a unit digit symbol is indicated graphically at 25' (Fig. 8). This same signal appears as an inverted voltage pulse indicated at 28 and appears at the anode 27 of the photoelectric cell. This voltage pulse 28 is applied to the grid 29 of a cathode follower amplifier 31 the output of which is taken from the circuit of the cathode 32. A suitable cathode resistor 33 is provided with a suitable slider 34 to control the amplitude of the signal applied to the input of the following audio amplifier 36, the output of which is supplied to a conventional cathode follower 37 having an output conductor 38. Thus, the light pulse 25' falling on the photoelectric cell 26 appears as an amplified positive electrical pulse 39 on the conductor 38.

As previously mentioned, the film 25 is moved in such a direction that the symbols on the sound track would be presented in a sequence beginning with the digit of least significance and this is represented in Fig. 3 wherein the film 25 is represented as moving from the right to the left as indicated by the arrow. It will be understood that the electrical signal pulses 39 delivered at the output conductor 38 will be of a sequence and duration corresponding to the characteristics and relative position of the symbols on the film. A group of 12 of such signals is represented in the upper portion of Fig. 3. As previously mentioned, the first 10 signals of the code group represent the magnitude of a discrete point of a time function and the 11th and 12th symbols represent channel identification. The 13th symbol of the group covers more than three signal spaces and in fact extends to the beginning of the next data code group. The 13th pulse, representing the read pulse, causes the digital registers to pass their signals into the appropriate channel.

The symbols for the channel codes are arbitrarily selected with 01 indicating utilization channel 16–1 for azimuth data; 10 indicating utilization channel 16–2 representing elevation data; and 11 indicating channel 16–3 representing range data. The graphical representation in Fig. 3 represents the three different types of signal pulses which are distinguished by their length. The decoder 16, shown in detail in Fig. 9, comprises a time discriminator to separate these three types of pulses and to direct them into the appropriate circuits connected to the binary register 17 and the channel selector 18. The decoder 16 also has an amplitude discriminator function which serves to minimize the effect of noise and other extraneous signals.

The output from the conductor 38 of the amplifier 37, Fig. 8, is supplied to the input terminal 48 of the decoder 16, Fig. 9. Since the audio amplifier 37 is A. C. coupled, a D. C. level restorer in the form of a diode 51 is used to provide a fixed reference for the amplitude discriminator. This diode 51 prevents the voltage on the input terminal 48 from falling below ground or zero potential but permits it to rise above this potential.

The pulses supplied to the terminal 48 are passed on to a bistable multivibrator of conventional construction comprising tubes 52 and 53. When the grid 54 of the tube 52 is at ground potential the tube 53 conducts but when an input pulse such as pulse 39 increases the potential of the grid 54 in a positive direction the tube 52 conducts and the tube 53 is cut off. The output from the plate 56 of tube 52 is coupled through a large condenser 57 to output terminal 58, which constitutes the input to the discriminator sections 16a, 16b and 16c of the decoder 16. The signal supplied to the terminal 58 is inverted with respect to the input pulse supplied to the terminal 48 and its amplitude is independent of the amplitude of the signal applied to the terminal 48. The parameters of the multivibrator are so chosen that a positive potential of over 18 volts on the grid 54 causes the tube 52 to fire and a reduction of bias on the grid 54 to a positive 8 volts will cause it to cut off. This circuit has a strong discrimination against spurious signals and produces a pulse having a very steep rise and fall. The remainder of the decoder 16 consists of three similar time discrimination circuits having different time constants, which direct appropriate signals corresponding to the coding spstem utilized out over the three output channels 16d, 16e and 16f. The selective energization of these three channels is accomplished by employing R–C timing circuits all of which are energized from the terminal 58. The circuit arrangement is such that the shorter pulse which represents the zero digit, will cause the generation of an output pulse on channel 16d to the binary register 17, see Figs. 1 and 10, and this pulse may be termed the "shift" pulse because of the particular action it causes in the binary register as will become more clear from the subsequent description. The "read" pulse is the longest pulse and causes the generation of output pulses on channels 16d, 16e and 16f. The "unit digit" pulse is intermediate in length and causes output pulses on channel 16d and 16e.

The "shift" pulse is so named because, as will appear later, it causes each state of condition in each of the register stages to be shifted one stage to the right, while the "digit" pulse supplies a new state in the stage 13 to be thereafter shifted by a subsequent "shift" pulse.

The respective sections 16a, 16b and 16c which supply the outputs to respective channels 16d, 16e and 16f are provided with respective sawtooth generator tubes 61, 62 and 63, associated in circuits having respective time constants determined by the respective resistances and condensers 61R, 61C; 62R, 62C; and 63R, 63C. The parameters of these sawtooth generators are so chosen as to produce a rise in the voltage of the respective anodes of tubes 61, 62 and 63 to some arbitrary value in the order of the difference in length of pulse to which they are selective.

The decoder 16 selectively generates signals in the respective sections 16a, 16b and 16c and supplies these signals in the respective output channels 16d, 16e and 16f depending upon the length of the pulse received at the input of the decoder. Any input signal over approximately 700 microseconds in length will cause the production of an output pulse in all three channels. The next shortest input pulse between approximately 350 microseconds and 700 microseconds in length will produce an output pulse in each of the channels 16d and 16e, while any input pulse of more than 120 microseconds duration but less than approximately 350 microseconds in length will produce an output pulse in channel 16d only. This action is graphically illustrated in the graphs of Fig. 4. As previously mentioned, the signals in channel 16d may be referred to as shift pulses because any pulse over channel 16d causes a state of condition in any one of the register stages to be shifted to the right to leave room for the storage of a succeeding digit pulse over channel 16e. It should be pointed out here that although the binary register may be referred to as a means for storing binary digits, there is no actual storage of energy in these different stages. As will be pointed out later each of the register stages is essentially a scale-of-two circuit with two stable states.

The manner in which the decoder 16 applies the appropriate digit signals to the various stages of the binary register 17 will now be described. It is to be understood that the discriminator sections 16a, 16b and 16c of the decoder 16 are substantially identical except for the time constants, that is, the charging rates of their respective sawtooth generators previously mentioned. Accordingly, it will be necessary to describe in detail only one of these sections although it will be necessary to refer to all sections to explain the operation. The complete section shown in Fig. 9 will be selected for purpose of explanation and will be described in connection with an example of operation.

As will be understood from the previous description when a transparent striation 25 in the film 8 appears in front of the exciter lamp 21 a corresponding voltage pulse will be supplied from the output conductor 38 of the audio amplifier 37 of Fig. 8 and this constitutes the input signal to the terminal 48 (Fig. 9) of the decoder 16. The pulses supplied to the terminal 48 are passed to the bistable oscillator comprising the tubes 52 and 53. As has been previously described this multivibrator is so designed that a positive potential of over 18 volts on the grid 54 causes the tube 52 to fire and reduction of bias on the grid 54 to a positive 8 volts will cause it to cut off. The voltage pulse resulting from the operation of tube 54 appears as a negative signal pulse at the terminal 58 thereby simultaneously applying the negative pulse to the control grids of the respective sawtooth generator tubes 61, 62 and 63 respectively. All of these tubes are normally operated at substantially zero bias, so that the tubes are normally conducting and their plates are only a few volts above ground. A negative pulse on their grids cuts off all of the tubes 61, 62 and 63, simultaneously. Accordingly, the potential of the anodes of the respective tubes 61, 62 and 63 begin to rise exponentially under the control of their respective timing circuits and each generates a sawtooth wave. The time variation of the electrical signal resulting from the movement of the coded sound track on film 25 in front of the soundhead is represented at A in Fig. 4. The widths of the three types of pulses determines which of the output channels 16d, 16e and 16f will supply an output signal.

Each of the respective sawtooth generator tubes 61, 62 and 63 has its plate connected to a diode biased at approximately 33 volts. As long as the sawtooth waves generated do not exceed this value the respective diodes will not conduct and therefore the plate voltages of the tubes 61, 62 and 63 will rise exponentially. This bias voltage is indicated on each of the graphs of Fig. 4. Taking the section 16b as an example, when the diode 69 conducts, the signal on its cathode 71 is supplied through the condenser 81 to the control grid 76 of the triode 77. The bias on the diode 69 is produced by the resistors 72, 73 and 74. The coupling condenser 81 differentiates the signal from the diode 69 and the tubes 77, 78 and 79 constitute a high gain non-inverting amplifier which further differentiates and clips the tops of the negative peaks and the negative portion of the signals are removed in the tube 78 which is operated at zero bias. Further differentiation is effected by condenser 82 resulting in a moderately sharp pulse in the output channel 16e. The bias on the tube 79 which is operated as a cathode follower serves to clip the lower portion of the waveform.

The comparative operation of the three discriminator sections 16a, 16b and 16c of the decoder 16, as well as the specific operation of the "digit" section 16b is graphically illustrated in Fig. 4, where the time variation of the input signal on the terminal 48 is represented on the single continuous time axis of curve A. The selective effect of the pulse width upon the generation of output signals in the respective output channels 16d, 16e, and 16f is compared in the graphs B, C and D. It should be stated here for reasons of clarity, that there is not necessarily any chronological relation between the time axes of the graphs B, C and D, although the width of the pulses of the single time axis of graph A is projected onto these other time axes to illustrate the action in the separate discriminator sections of the decoder 16 in response to the different width signals. This statement is made to emphasize the fact that no more than one output pulse is supplied in any one output channel in response to any input signal, regardless of the width of the latter.

The pick-off bias voltage on the pick-off diodes and the plates of the respective sawtooth generator tubes is indicated as the straight horizontal lines marked "33V." The time variation of the plate potentials of the respective sawtooth generator tubes is represented by the sawtooth curves in the respective graphs B, C and D while the corresponding output pulses in the respective output channels 16d, 16e and 16f, as marked on the right hand side of Fig. 4, are represented by the pips in the lower line of each graph.

Then reading downwardly, beginning with the left hand side of Fig. 4, it will be clear that the plate potentials of the respective sawtooth generators begin to rise simultaneously at a point in time corresponding to the initiation of a negative pulse at terminal 58. It will be noted that the plate voltage of the sawtooth generator for output channel 16d reaches the cutoff value in about half of the shift pulse width, or in other words in about 120 microseconds. After this point the sawtooth waveform will not continue to rise at its initial rate because the pick-off diode has started to conduct. The differentiation of this change in potential rise produces the pulse in output channel 16d. It will be noted that the plate potential continues to rise after the diode starts to conduct but this is of no significance since the circuit has already performed its function.

Referring to the curves C and D, it will be noted that the rates of rise of the plate voltages of the sawtooth generator tubes for the other two output channels are such that the potentials do not reach the 33 volt pick-off potentials of their associated diodes within the width of the shift pulse and therefore no signal is supplied to the respective output channels 16e and 16f.

It is believed that from the above the complete discriminating action of the decoder 16 will be obvious but further remarks may not be amiss. Reading the B graph from left to right it will be seen that only one shift pulse is delivered by output channel 16d in response to any input signal of a length greater than about 120 microseconds. It will also be clear that a shift pulse from output channel 16d will always precede in time any output pulse in either of the other two output channels.

Now reading downwardly in the middle column of graphs it will be seen that the plate potential of the sawtooth generator tube for output channel 16e that is, tube 67, reaches the pick-off potential of diode 69 after about 350 microseconds and since this is within the time duration of a digit pulse, an output pulse will be supplied by output channel 16e. It will be clear that the output pulse in channel 16e will occur about 240 microseconds after the shift pulse in response to a digit pulse input signal. Since the time constant of the sawtooth generator for channel 16f is such that the plate potential does not reach the pick-off potential of its associated pick-off diode within the width of the digit pulse of 480 microseconds no output pulse will be supplied by output channel 16f.

Referring now to the column of graphs on the right hand side of Fig. 4, it will be seen that an input pulse of sufficient length to permit the plate potential of the sawtooth generator tube for output channel 16f to reach the pick-off potential of its pick-off diode will cause the generation of output signals in all three output channels. The read pulse discriminator gives an output pulse in output channel 16f in response to any input signal longer than about 700 microseconds.

It will be noted that the time discrimination period of the generators for each of the output channels is chosen such as to be about midway of the length of the input signals to which the respective discriminator sections are to be responsive, in order to provide the proper safety factors and prevent interference from spurious signals. It is to be noted that no spurious impulse having a duration less than the discrimination time of these circuits will actuate them. Similarly, all signals of an amplitude insufficient to trigger the multivibrator tubes 52 and 53 will be rejected. This is particularly advantageous in keeping the circuits from being triggered by short breaks which might occur in the opaque sound track between data frames.

As previously mentioned, the discriminator sections 16a, 16b and 16c are substantially identical except for their sawtooth generator characteristics. There is a further difference in that the output from the final tubes in output channels 16d and 16e is taken from the cathode circuits to produce positive output pulses while the output from channel 16f is taken from the anode of the tube 85 in order to produce a negative output pulse for reasons hereinafter explained.

Referring to Fig. 7, the manner in which the output digit pulses from discriminator 16 are set into the stepping register is illustrated. In Fig. 7, the single vertical line of digits represents their relative position of the corresponding symbols recorded on the motion picture film. Therefore, as the film is moved upwardly in the direction of the arrow the zero digit pulse supplied to the decoder 16 will cause a zero or "shift" pluse to be supplied to channel 16d (Fig. 1) and this will cause the 13th stage of the digital register to assume a state corresponding to a zero digit if the stage is not already in that condition or state. On the other hand the condition of stage 13 will not change if its instant state of condition corresponds to the impulse received over channel 16d, although its then state of condition, whatever it may be, will be transferred to stage 12 if the condition of that stage is different from that of stage 13. When the succeeding unit digit signal is supplied to the decoder 16, from the description immediately above, it will be seen that one shift pulse will be sent down the channel 16d which will cause the state of condition of the 13th stage (corresponding to the previous zero digit) to be shifted to the 12th stage and the subsequent so-called "digit" pulse will be sent down channel 16e, causing the stage 13 to return to the state corresponding to a unit digit. When a signal representing a subsequent unit digit, for example, is supplied to the decoder 16, a shift pulse will be sent along channel 16d causing the respective conditions of stages 12 and 13 to be transferred one stage to their right. Since there are only two alternate states and stage 13 was in unit digit condition it must now be in zero digit condition. The accompanying subsequent so-called digit pulse will return stage 13 to unit digit condition and so on. It should be pointed out here that the circuitry of the register 17 is such that upon a receipt of a signal each succeeding stage assumes the condition of its next preceding stage and that since stage 12 had previously been in the position corresponding to the unit digit it retained that condition upon the receipt of the unit digit signal from channel 16e. This process is repeated for all the subsequent signals until all of the stages of the register 17 are set up in states corresponding to the sequential arrangement of the digital symbols on the film 25. The subsequent read pulse transfers a signal of a value dependent upon the relative setting of all these stages into a subsequent utilization circuit in a manner which will be more fully described hereinafter.

*Binary digital register*

From Fig. 1 it will be seen that 10 of the stages of the digital register 17 are connected to each of the channel translators 19a, 19b and 19c. The 11th and 12th stages are each connected to the channel selector 18 and the 13th stage does not have any output since as previously mentioned, this stage serves to store a unit digit condition which condition is subsequently shifted to the chain of 12 coding stages. It will also be seen from Fig. 1 that the channel selector 18 is connected to each of the channel translators. The channel selector 18 puts out a signal to energize the channel translators individually depending upon the digital code channel identification which has been stored in the stages 11 and 12, it being understood that symbols to identify the proper channels are included in the code group accompanying the binary number representing the magnitude of a discrete point on one of the time functions. The three output channels from the channel selector 18 to the respective channel translators are identified respectively by the code 01 which controls channel translator 19a to route control signals over channel 16–1 to azimuth servo 20a; the code 10 identifies the channel which supplies control signals to the channel translator 19b which routes control signals over channel 16–2 to the elevation servo 20b; and code 11 identifies the channel which controls translator 19c which routes control signals to the range servo 20c.

Referring to Fig. 10, each of the register stages are identical with the exception of stage 13, which has a different triggering circuit and has no output to channel selectors because it merely stores the unit digit pulse as previously mentioned corresponding to the read pulse. Each stage is basically a scale-of-two multivibrator or flop-over oscillator. Such a circuit has two stable states which may be identified as S1 and S2. Arbitrarily, for each stage state S1 is defined as the condition when the right hand tube of each multivibrator is conductive and the circuit is so arranged that this state of condition corresponds to a zero digit. Similarly, state S2 is defined as the condition when the left hand tube of each multivibrator is conducting and the circuitry is such that this corresponds to a unit digit. It will immediately become apparent that since the individual stages change their state every time a new pulse is supplied, the initial condition of the 13th stage will eventually progress to the right to stage 1 and the combination of conditions of all of the stages when all have been actuated may correspond to the digit places of a binary number. Therefore, when the subsequent read pulse is applied over channel 16f (see Fig. 9 to Fig. 11 and Fig. 14) to the channel selector 18 after the stages 11 and 12 have identified the proper channel the appropriate translator will be energized to supply a voltage to its output channel which corresponds to the binary number represented by the combination of states of conditions then existing in the various stages.

The direction of the progressive shift of the states of conditions of the various stages of the register 17 is illustrated by the diagram A in Fig. 10. For a proper understanding of the operation of the register 17 it should be remarked here that all of the stages, except stage 13, are provided with pentode trigger tubes which are so arranged in the circuit that when a negative pulse is applied to one of their grids a subsequent pulse, positive or negative, on the other of its control grids is ineffective so that one of the tubes of the multivibrator is in a non-conducting condition a control pulse which would normally change the state of that tube to the condition that it is already in, will have no effect. This feature is very important in that it explains how it is possible to progressively shift the states of conditions of the different tubes progressively from stage 13 to stage 1.

It is to be noted that stage 13 has triode triggering tubes while all the other stages have pentode triggering tubes. The reason for this will become apparent as the description proceeds.

Referring specifically to the wiring diagram of Fig. 10 it will be noted that stage 13 includes a pair of triodes 101 and 102. These tubes are connected in a conventional manner as a multivibrator for bistable operation, both of the tubes 101 and 102 having their respective control grids connected through suitable resistors 103 and 104 to a high negative bias on a suitable voltage divider 106. Also the control grid 102a of the triode 102 is connected through a suitable resistor 107 to the anode of tube 101. Likewise the control grid 101a of the triode 101 is connected through a suitable resistor 108 to the anode of triode 102. A pair of triggering triodes 109 and 111 have their respective control grids connected to channels 16e and 16d to trigger the multivibrator triodes 101 and 102, respectively. The output from the triodes 101 and 102 is taken from their respective anode resistors 107 and 108 through conductors 112 and 113 and are connected to No. 3 control grids of the respective triggering pentodes 114 and 116 of stage 12.

In general, the No. 3 grid of each of the triggering pentodes of each stage is connected to a multivibrator plate of the immediately preceding stage. It will also be noted that the anode of the multivibrator tube in one stage is connected to the No. 3 grid of the trigger pentode at the opposite end of the succeeding stage for the purpose of effecting the progressive stepping of the state of the conditions or configurations of multivibrators from one stage to another. Also the No. 1 grids of all of the pentode trigger tubes are connected in parallel for energization simultaneously by all of the input "shift" pulses from channel 16d with the result that upon the application of a "shift" pulse each stage assumes either state S1 or S2 whichever happens to be the state of the next preceding stage at the time that the shift pulse is received. This is exemplified by reference to stage 12 where it is to be noted that the No. 3 grids of the pentodes 114 and 116 are connected, respectively, to the anode circuits of multivibrator triodes 102 and 101 while the No. 1 grids of each of the pentodes 114 to 116 are connected to the "shift" pulse channel 16d. The multivibrator triodes 117 and 118 of stage 12 have their respective anodes connected to the anodes of the pentode trigger tubes 114 and 116 and are otherwise connected in a manner similar to the multivibrator tubes 101 and 102 of stage 13. As in the previous stage the grids of the triodes 117 and 118 are connected through respective resistors 119 and 121 to a point of high negative potential on the voltage divider 106. The anodes of the multivibrator tubes 117 and 118 are connected through respective anode resistors and conductors 122 and 123 to the respective No. 3 grids of pentode trigger tubes 126 and 124 of stage 11. It is to be noted here that the output of the left hand multivibrator triode 118 of the stage 12 is effectively connected to the right hand multivibrator triode 72 of stage 11.

It is necessary to have all of the No. 3 grids of the pentode trigger tubes controlled by voltages in the preceding stage immediately before the "shift" pulse occurs and not to be affected by any voltage change in the preceding stage after the start of the "shift" pulse. To this end, a slight time lag is introduced into the coupling circuits of all of the No. 3 grids of the pentode tubes in the form of an R–C combination exemplified by the resistor 128 and the condenser 129 between the output of triode 102 of stage 13 and the trigger pentode 116 of stage 12. The delay networks are similar in all of the other stages.

The circuits of stages 1 to 10, inclusive are identical with that of stages 11 and 12, which have already been described and therefore detailed discussion of these former stages is not necessary. It need only be mentioned that the output from stage 12 in the form of conductors 131 and 132 and the output from stage 11 in the form of conductors 133 and 134 are connected to the channel selector 18 as generally indicated in Fig. 1 and more specifically indicated in Fig. 14, and that the output from stage 11 is also connected to the input of the stage 10. Similarly, all of the other stages are connected in cascade. The right hand multivibrator tube of each of the stages is connected to each of the translator units 19a, 19b and 19c as shown in Fig. 1. In Fig. 10 the outputs from the respective stages are represented by the subscript numbers on the terminal strip 136. As shown in Fig. 14 the terminals on terminal strip 136 are connected to corresponding terminals on Fig. 12 indicated by corresponding subscript numbers.

To illustrate the action of so much of the device as has been described, let it be assumed that 13 zero digit pulses are supplied to the decoder 16 one after the other at time intervals of approximately 720 microseconds. From what has previously been said it will be clear that only "shift" pulses will be generated and sent out over channel 16d. The first pulse applied to all of the No. 1 grids of the pentode trigger tubes in the various stages may be disregarded. This same first pulse will be applied to the grid of the triode 111 which will cause the latter tube to conduct thereby lowering the positive potential of the anode of tube 102 and applying a negative pulse to the control grid 101a of the multivibrator tube 101 cutting off the latter tube if it was conducting at the time the pulse was received. The effect of this is to make multivibrator tube 102 conductive or, if it was conductive before, it will remain in this state S1. By this pulse the stage 13 is thus put, or kept, in state S1 which state has previously been defined as the condition when the right hand multivibrator tube of the stage is conducting. Also as previously mentioned this state or condition also corresponds to a zero digit. A second "shift" pulse, finding the stage 13 in state S1 leaves it so. This second "shift" pulse also puts stage 12 in state S1 which is the state of the preceding unit in the manner which has been clearly described above. A third "shift" pulse leaves stage 13 and stage 12 in the state S1 and puts stage 11 in state S1 since this is the state of the preceding stage 12. This action is completed in the remaining stages upon the receipt of successive shift pulses which correspond to zero digits and accordingly after 13 of such "shift" pulses have been received the original state S1 in stage 13 will have migrated to stage 1. Also the final static state S1 in the stage 1 will correspond to the chronologically first "shift" pulse which is received and similarly the S1 condition of stage 2 will represent a chronologically second pulse, etc.

Similar action takes place when the code group includes zero and unit digit pulses except that the "shift" pulses which accompany every digit pulse, whether it is a zero or unit digit, causes migration of the states of conditions of the stages progressively from the left to the right (see Figs. 1 and 7) while the so-called digit pulse supplied over channel 16e puts the stage 13 in the S2 state corresponding to a unit digit every time a unit digit is supplied to the decoder 16. Following this action in detail, let it be assumed that the first pulse received by the decoder 16 is again a zero digit pulse. This will cause a "shift" pulse to be generated and sent along channel 16d and this will put the stage 13 in state S1 as previously described. Let it be assumed that next a unit digit pulse is received by the decoder 16. This unit digit pulse will cause a "shift" pulse to be generated and sent along channel 16d followed in chronological sequence by a pulse over channel 16e. Here again the "shift" pulse associated with the unit digit finds the stage 13 in state S1 and leaves it in this condition and passes this state S1 onto the stage 12 thereby making the multivibrator tube 117 conducting. The accompanying so-called digit pulse on channel 16e is applied only to the grid of the trigger triode 109 making the tube 101 conductive so that the stage 13 is put in state S2 corresponding to a unit digit. Now let it be assumed that the third digit signal received by the decoder 16 is also a unit digit as illustrated in the chart of Fig. 7. The "shift" pulse generated as a result of this unit digit signal will first be received by the stage 13 and since it is already in state S2 it will remain in this condition. The condition S2 of stage 13 will be passed on to stage 12 because that was the condition of stage 13 at the time of the receipt of this last pulse. Likewise the same signal arriving at stage 11 will cause this stage to return to or remain in state S1 which happened to be the condition of stage 12 at the time the pulse was received. Accordingly, as is shown in Fig. 7 the state S1 corresponding to the original zero digit has now migrated to stage 11 and stage 12 has now assumed state S2 corresponding to the first unit digit. The so-called digit pulse which is generated as a result of the third digit pulse to the decoder 16 will be generated and supplied over channel 16e tending to trigger triode 101 to conducting, or S2 condition but since this tube is already in this condition, it will so remain. Subsequent signals, be they zero or unit digit signals, will cause the successive stages to be placed in a condition of that of the next preceding stage at the time of the reception of the signal and the stage 13 will be put in a stage corresponding to the last digit pulse received until the original state of the stage 13 has migrated to the stage 1 and all of the other stages have assumed the condition corresponding to the subsequent digit signals as pictorially shown in Fig. 7. Thus the chronologically first digit symbol will be represented by the state of condition S1 of stage 1 and the second digit symbol, as distinguished from the so-called aforementioned digit pulse, will be represented by the condition S2 of stage 2 and so on for all the other stages.

The read pulse, that is, the longest one which follows the binary number code group and the channel identification digits, see Fig. 1, is not applied to the register 17, but the accompanying "shift" pulse over channel 16d, furnishes the 13th shift pulse for the register 17 and the accompanying "digit" pulse over channel 16e puts the stage 13 in state S2 corresponding to a unit digit, which state or condition effectively stores a unit digit for subsequent transfer to stage 12, as previously mentioned. However, as is clear from the circuit diagrams of Figs. 1 and 10 no data corresponding to this unit digit is transmitted to the translator or utilization circuits.

From the foregoing it will be seen that the states S1 and S2, correspond, respectively, to the low and high potentials of the anodes of the respective multivibrator tubes of the various stages and therefore a combination of these can be utilized to represent the digits of a binary number or any other code of identification, or the like. Therefore, if the effect of these conditions are associated in some prescribed manner an electrical quantity can be provided which is proportional to a binary number and, if desired, this electrical quantity can be switched or directed to any suitable utilization device. To this end, the channel selector 18 and the associated translator units 19a, 19b and 19c are provided.

Channel selector

As is clear from Fig. 1 the channel selector 18 is energized from the channel 16f of the decoder 16 and the code identification stages 11 and 12 of the digital register 17. It is clearly indicated in Fig. 1 that the digital code 01 controls the translator 19a; code 10 controls the translator 19b; and code 11 controls the translator 19c. The channel selector 18 includes suitable coincidence circuits, or in other words, electronic interlock circuits, so that a signal will be supplied to the utilization device, such as the servos 20a, 20b and 20c, respectively, only when the coincidence elements are in their proper condition.

The function of the channel selector 18 is to connect simultaneously all of the outputs of stages 1 to 10, inclusive, of the binary register 17 to one of the respective translators 19a, 19b or 19c, dependent upon the binary code identification received from the register stages 11 and 12. The state of the condition of each stage 11 and 12 determines which of the corresponding relays in one of the subsequent translators will be energized to supply an electrical quantity to the utilization device connected to that translator which is a function of the binary digital conditions stored in the stages 1 to 10 of the digital register 17.

The channel selector 18 (see Fig. 11) proper comprises fundamentally two simple components, namely, a Rossi triple coincidence circuit and a signal shaping circuit for each of the channel identification circuits. In other words, there are three triodes in each of the three code identification channels. The input to these coincidence circuits are connected to the outputs from stages 11 and 12 (see Fig. 10) of the digital register 17 and to channel 16f from the decoder 16. Taking the 01 code channel, for example, the three triodes 150, 151 and 152 have their anodes connected in parallel and through a common terminal 153 and a common resistor 154 are connected to a source of positive potential. Similarly, the anodes of the second bank of triodes 156 have their anodes connected in parallel and through a common terminal and resistor are connected to a source of positive potential. Likewise, the same is also true of the third bank of tubes 157. Channel 16f is connected to the control grids of the third tube such as triode 152, in each of the banks in each of the three code of identification circuits. The control grid of triode 150 is connected to the right hand multivibrator tube 72 of stage 11 through the conductor 134. The control electrode of triode 151 is connected in parallel with the control electrode of the middle tube of the third bank of triode 157 of triodes and is connected to the left hand multivibrator triode 118 of a stage 12 of the binary register 17. The control grids of the first tube in each of the banks 156 and 157 are connected in parallel and to the anode of the left hand multivibrator tube 70 of stage 11 and through conductor 133. The control grid of the middle tube of bank 156 is connected to the right hand multivibrator tube 117 of the stage 12 through conductor 132.

The common anode resistor for each of the respective banks of triodes, for example the resistor 154, is of such value that when any of the tubes of any of the three banks is conducting, the associated respective common terminal, such as the point 153, will be drawn down to very nearly ground potential. Also when none of the tubes are conducting the anode potentials will rise substantially to the level of the positive supply. Thus it will be seen that the abrupt change in potential when one of the tubes of a bank is conducting and when it is not conducting will produce a sharp positive pulse. Referring specifically to the operation of the channel for the 01 code identification, it will be seen that when the potential of conductor 134 is low corresponding to a condition when the right hand multivibrator tube 72 of the stage 11 is conducting representing a zero digit, the triode 150 will be nonconductive. Likewise when the left hand multivibrator tube 118 of the stage 12 is conducting representing a unit binary digit the potential of conductor 132 will be low and accordingly, the middle triode of bank 156 will be biased below cutoff and the tube will be nonconducting. The bias on the third tube of the group namely, triode 152 which is connected to the channel 16f is normally biased so that it is conductive thereby holding the common terminal 153 to a low value. If under the conditions mentioned ammediately above, a negative "read" pulse is received by the control grid of tube 152 it becomes nonconductive and since the other triodes 150 and 151 of the same bank are also nonconductive the common terminal 153 immediately rises sharply in potential. This high voltage pulse provides a signal which is passed through the subsequent wave-shaping circuit from which it is subsequently supplied to the translating unit (see Fig. 12). Further analysis of the circuits will also reveal the fact that a similar identification code 10 will cause a high voltage pulse at the common terminal 160 of the second bank 156 and a code identification code of 11 will produce a positive pulse at the common anode terminal 162 of the third bank 157.

The pulses supplied from the coincidence circuits do not have the correct polarity impedance and accurate time duration to be utilized to operate the subsequent units and consequently it is necessary to apply them to pulse shaping circuits. Taking the 01 channel for example the positive pulse appearing at the common terminal 153 is sharpened by the condenser 163 and high frequency transients are bypassed to the ground through condenser 164, the sharpened pulse being applied to the grid of a normally nonconductive trigger triode 166. The following tubes 167 and 168 constitute a monostable multivibrator having an effective recovery period of approximately 250 microseconds and the parameters of the circuit are so chosen that the tube 168 is normally conductive. Upon the receipt of a trigger pulse the tube 168 produces at its anode a positive 250 microsecond square pulse which is applied to the control grid of the cathode follower 169. The output from the cathode follower 169 is supplied in shunt through condenser 170 to the control grids of two amplifiers 171 and 172 the outputs of which are inverted 250 microsecond negative rectangular pulses.

The outputs from the anodes of tubes 171 and 172 are in the form of negative pulses which are supplied through suitable differentiating networks including the condensers 173 and 174, respectively. After such negative pulses pass through a differentiating network their trailing edges will produce positive pulses which will be supplied by the respective conductors 176 and 177 to suitable translation apparatus which converts the pulses representing the binary digits into electrical quantities.

From what has already been said it will be readily apparent that since by its very nature each stage of the register 17 of a binary digital system has only two values, zero and some predetermined value, such as unity, and therefore some means must be provided for translating the combinations of the order of conditions of the prearranged stages into terms of quantities whose values can be varied by small increments. This is accomplished by the translator component one for each utilization channel, which include coincidence or interlock circuits and appropriate relays for combining in the proper manner a predetermined number of conductances, the values of which bear a relation to each other which is proportional to the magnitudes represented by the respective digits of the binary number.

Translator

The translator component of the present invention is exemplified by the relay control system shown in Fig. 12 and the relay and synthetic potentiometer unit shown in the Fig. 13.

The relay control system of Fig. 12 consists of 3 banks $T_1$, $T_2$, $T_3$ of ten gas-filled electron discharge devices, such as thyratron tubes. Each bank of thyratrons corresponds to the respective utilization channels 16-1, 16-2 and 16-3. In turn there is one tube in each bank corresponding to each of the ten stages of the digital register 17. Referring specifically to the bank of thyratrons in the 01-16-1 (see Fig. 1) channel the output conductor 176 (see Fig. 11) is connected to the anodes of all of the thyratrons in one bank (see Fig. 12) which may be represented by the thyratron tubes 181 and 182, the first and last tubes of the first bank, through suitable coupling condensers 183 and 184, respectively. The thyratrons are of the dual grid type and three of the electrodes of each such as the anode 181a, the shield grid 181b and the control grid 181c are used as control elements. The control grid 181c is connected to one of the output conductors from one of the stages of the binary register such as conductor 10a (Fig. 10), which is in turn connected to conductor 12a of Fig. 12. In this connection see Fig. 14. It is to be understood that each of the other output conductors from the 10 digital stages will be connected respectively to the first grid of each of the other thyratrons. The output conductor 177 (see Figs. 11 and 12) is connected through a resistor 186 to the shield grid 181b of thyratron 181. A suitable resistor 187 in series with the resistor 186 and ground produces a fixed negative bias on the shield grid 181b, of approximately four volts. The circuit described provides a three-way interlocking control dependent upon the output from the stages 11, 12 and 13 of the register 17 (see Fig. 14). In other words unless the control pulses on the control grid 181c, the shield grid 181b and the voltage on anode 181a are of the proper order in time, amplitude and polarity, the thyratron 181 will not fire and therefore no signal will be sent to the relay controlled by that tube. The anode of thyratron 181 is connected through terminal 1-01 to its associated relay. Stating it another way, the channel identification code conditions all of the thyratrons of one bank corresponding to one of the utilization channels and then the subsequent read pulse triggers the respective thyratrons.

The anodes of each of the thyratrons of each bank are connected through an energizing coil of a single-pole double-throw switch relay to a source of positive potential. The contacts of the respective relays control the energization of conductances representing a numerical value of various binary digit places. Referring specifically to the channel 01-16-1 (see Fig. 1), the anode of the thyratron 181 (Fig. 12) is connected through the energizing windings 189 and 190 of a relay $R_1$-16-1 (see Fig. 13), and a series resistor 192 to a source of positive potential of approximately 135 volts. Similarly, the anode of the thyratron 182 is connected through the similar energizing windings 193 and 194 of relay $R_{10}$-16-1 and a series resistor 196 to the same source of positive potential. In order to provide a current surge to aid the pickup of the relays and to reduce the required steady current to the holding current value a suitable resistance-capacity network is provided. As an example, associated with relay $R_1$-16-1 is a resistor 200, a capacitor 201 and a neon indicator tube 202 connected in series across a source of positive potential of approximately 150 volts and the junction between the resistor 192 and the relay winding 190 is connected by a suitable conductor 203 to the junction point between the condenser 201 and the indicator tube 202.

It will be readily understood that the relays $R_2$-16-1, $R_3$-16-1, $R_4$-16-1 ... $R_9$-16-1 are controlled in a manner similar to that described with reference to relays $R_1$-16-1 and $R_{10}$-16-1. Also, it will be understood that a similar relay control arrangement is provided for channels 10-16-2 and 11-16-3.

Referring to the operation of this relay control let it be assumed that the stage 1 of the binary register is in state S1 representing a zero digit at which time the output conductor from stage 1 to the terminal 10a is highly negative, possibly in the neighborhood of 50 volts. That voltage is applied through the terminal 12a to the control grid 181c of the thyratron 181 holding the latter nonconductive under all circumstances. However, when stage 1 of the binary register changes to state S2 representing a unit digit the potential applied to the grid 181c changes to approximately zero. Because of the parameters of the circuit and because of the value of the constant positive voltage applied to the anode of the thyratron 181 this is still not enough to fire the thyratron tube 181 but this tube has now been conditioned so that a subsequent read pulse over the conductor 16f will fire it in the manner hereinafter immediately described. A read pulse applied to the channel selector, Fig. 11, after the latter has been energized by the identification stages 11 and 12, will be applied to the channel translator 19a and through the amplifiers 171 and 172 and their differentiated output circuits, short positive pulses will be applied respectively to the anode and the shield grid of the thyratron 181 in the manner previously described. This causes the thyratron 181 to fire and the tube remains conductive regardless of any subsequent voltage applied to the control grid unless the anode voltage is subsequently reduced. If the next signal should be a pulse representing a unit digit the control grid voltage on the thyratron 181 will remain high. Such a pulse immediately precedes the subsequent read pulse which is associated with each group of binary register pulses. The leading edge of this next read pulse will be differentiated and will result in sharp negative pulses being applied to the anode and shield grid of the thyratron 181, turning off the latter but only for the 250 microsecond duration of the read pulse. This pulse is too short to actuate the relay $R_1$-16-1 but the differentiated trailing edge of the read pulse will again apply simultaneous positive pulses to the anode and shield grid causing the thyratron 181 to fire again. Thus a pulse representing a zero digit will fire the thyratron 181 or keep it fired and a pulse representing a unit digit will make the thyratron 181 nonconductive. The conducting and nonconducting conditions of the thyratrons correspond to the respective positions of the respective relays connected thereto, as indicated by the arrows in Fig. 7. It is to be understood that the output of each of the other 9 binary register stages will operate each of the corresponding relays in the translator unit. Thus a read pulse will cause the thyratrons in one bank selected by the preceding identification code to assume conditions corresponding to the conditions of the respective stages of the register 17, thereby causing the relays to set up an impedance or an electrical quantity representing the magnitude of a discrete point on one of the time functions.

The operation of the bank of relays controlled by the individual binary stages as previously described is adapted to energize corresponding circuits including admittances which are a function of the numerical value to be represented by each of the binary digit places. Referring to the relay $R_1$-16-1, for example, Fig. 13, this relay is provided with fixed contacts 210 and 211 which are connected to the opposite terminals of a source of potential with respect to ground represented by the symbol $E_1$. The movable armature 212, adapted to be operated under the influence of the energization of the energizing coils 189 and 190, alternately engages contacts 210, 211 and controls the energization of a resistor 213 the other end of which is connected to a terminal 214. This terminal 214 is common to resistors 216, 217, 218, 219, 220, 221, 222, 223 and 224 which are controlled by the corresponding relays for the other 9 stages of the binary register 17. The plurality of resistances just mentioned constitute collectively a synthetic potentiometer which, in accordance with the positions of each of the single-pole double-throw switches of each of the relays, exemplified by the relay $R_1$–16–1, determines an output voltage $E_o$ between the common terminal 214 and ground which is an analogue representation of the binary digits stored in the 10 stages of the binary digital register 17.

The potential $E_o$ may be utilized as an end result to operate an indicating device, or alternatively may be used to operate a servomechanism which latter embodiment is used to illustrate the present invention. In order to adapt the output potential $E_o$ to the operation of a servo, a suitable sensing transformer 226 is provided, the primary of which is connected between the terminal 214 and the slider 227 of a potentiometer 228 which is connected across the source of potential $E_1$. Also additional resistors 229 and 231 are added to the synthetic potentiometer to adjust the maximum and minimum voltages and to alter the slope of the characteristic curve. The slider 227 may be operated by a suitable mechanical connection 232 to the servomotor 20a energized by the secondary 225 of the transformer 226, constituting the utilization channel 16–1. The mechanical connection 232 and the slider 227 on the potentiometer 228 provides a negative feedback to bring the servo error signal to zero. It will be readily understood that a similar synthetic potentiometer is provided for each of the other utilization channels 16–2 and 16–3.

The digital translator is based on the principle that the voltage at the center of a multi-pointed star network is equal to the weighted average of the voltages at the points, with the weighting factors being proportional to the respective admittance. The operation of the binary digit translator may be readily understood by reference to Fig. 15 which discloses a source of alternating potential 223 which may have selectively connected in series therewith a plurality of individual impedances $Z_1$, $Z_2$, and $Z_3$, the output potential being represented as $E_o$ which may correspond to the $E_o$ previously mentioned. From Ohm's law, the current through $Z_1$ may be expressed as $$I_1 = \frac{E_1}{Z_1} = E_1 Y_1$$

where $Y_1$ is the admittance. Similarly the respective currents through $Z_2$ and $Z_3$ may be expressed as $E_2 Y_2$ and $E_3 Y_3$, respectively. The total current is therefore $$E_1 Y_1 + E_2 Y_2 + E_3 Y_3.$$

Since E is equal to $$\frac{I}{Y}$$

$$E_o = \frac{E_1 Y_1 + E_2 Y_2 + E_3 Y_3}{Y_1 + Y_2 + Y_3} \quad (1)$$

By the very nature of a binary system the values $E_1$, $E_2$ and $E_3$ must either be one of two values and in the embodiment of the invention illustrated the two values are zero and unity. It will be readily understood, of course, that any other two values could be used if desired as long as the values are far enough apart so that the equipment can readily distinguish between the two. Applying the above theory to the binary number translator previously described the source of potential 223 may be assumed to be the potential $E_1$ applied between the terminal 155 and ground in Fig. 13. The various resistors are of such values as to have admittances proportional to the relative significance of the binary digits in a geometrical progression ratio of 1:2. Accordingly, the admittance of the resistor 213 may be represented by the symbol Y since it corresponds to the digit represented by stage 1 of the binary register 17 and has a value of least significance, equal to unity. Accordingly, the admittance of the resistor 216 is 2Y and that of the resistor 217 is 4Y etc. Thus the resistors 213 and 216 to 224, inclusive, have such values that their conductances form a geometrical progression, being specifically an arithmetical progression of powers of the base 2 so that the values of the conductances vary by a geometrical progression ratio of 1:2. It will be seen from Fig. 13 that when the armatures of the respective relays $R_1$–16–1 to $R_{10}$–16–1, inclusive, are contacting their respective upper contacts, all of the resistors will have impressed across their terminals the input voltage $E_1$. When the armatures of the respective relays engage their lower contacts, the zero voltages are impressed across the respective resistors. Thus it will be seen that the voltages $E_1$, $E_2$ or $E_3$ are either zero or $E_1$ corresponding to a respective zero or unit digits and in view of the relative values of the admittances the output voltage $E_o$ is therefore proportional to $E_1$ multiplied by the factor representing the respective binary digit places which is determined by the corresponding switch positions. From what has been said it will be apparent that this factor is the value of the admittances of the respective impedances or resistors. The arrows in Fig. 7 correspond to the different positions of the armatures of the relays in representing the zero and unit digit places.

Either alternating or direct current may be employed as the voltage source $E_1$. However, in an alternative embodiment, where a special transformer with auxiliary windings is employed it will be apparent that only alternating current may be used.

An alternative arrangement for expressing switch positions corresponding to the digit places of a binary number in terms of an analogue representation of the binary number is shown in Fig. 16. In this embodiment, a source of potential $E_1'$ is derived from an energizing transformer 240 which has a main secondary winding 241 and ten auxiliary secondary windings 242, 243, 244, 245, 246, 247, 248, 249, 250 and 251. The main secondary winding 241 has 1,023 turns, this being equal to the decimal summation of all of the positive values of the ten binary digit places. The ten auxiliary windings are adapted to be connected in such a manner that their magnetic flux adds to the magnetic flux of the main winding 241. Respective single-pole double-throw switches, exemplified by the switch 242a having two fixed contacts 242b and 242c, which are connected respectively to the opposite ends of the respective windings, the armature of the respective switches being connected in series in the circuit between a slider 253 of a potentiometer 252 and one side of the main secondary winding 241. The energizing coils for operating the armatures of the relays is not shown but it is to be understood that these relays are identical with, and are connected in the same manner, as those illustrated and described in connection with Fig. 13. The ten auxiliary windings have turns the numbers of which form a geometric series having a ratio of 2. In other words, the winding 242 has one unit turn which corresponds to the analogue representation of the value of the first digit place, the winding 243 has two unit turns corresponding to the analogue representation of the value of the second digit place; the winding 244 has four unit turns corresponding to the analogue representation of the value of the third digit place, etc., including the tenth winding 251 which has 512 turns corresponding to the analogue representation of the tenth digit place. The utilization device in this embodiment is in the form of a servo 254 which is energized from a transformer 256 the primary of which is connected between one side of the main binary winding 241 and the armature of relay 242a. A suitable mechanical connection 257 operated by the servo 254 is adapted to move the slider 253 to null position on the potentiometer 252 which is connected across the main winding 241 to bring the error signal to zero every time one of the relays is operated to either cut-in or cut-out one of the ten auxiliary windings of the transformer 240. The type of servo used is not important as far as this invention is concerned and may be of conventional construction. It will be readily apparent from Fig. 16 that when each of the armatures of the respective relays engage their lower contact the associated auxiliary secondary winding will be cut out of the circuit and when the respective armatures engage the respective upper contacts the associated auxiliary windings will be cut into the circuit. Accordingly, it will be readily understood from the description of the previous embodiment how a binary number can be represented by the positions of the armatures of the various switches and how this will cause an electrical quantity to be delivered to the servo 254 which is an analogue representation of the binary number.

A further modified form of the synthetic potentiometer unit for translating switch or relay positions into a representative electrical quantity constituting an analogue representation is shown in Fig. 17. This embodiment is substantially identical with that shown in Fig. 16 except that in the latter embodiment a single-pole double-throw switch 262 is provided for alternately connecting one end of the secondary winding 261 or an intermediate tap 263 to ground. This permits the elimination of the larger secondary winding of the previous modification and at the same time furnishes the necessary neutralizing voltage. The tap 263 is very near the center of the winding but is placed to one side thereof by a very small amount. As in the previous embodiment, a suitable potential divider 264 is connected across the main secondary winding 261 and is provided with a suitable slider 266. In this instance the circuit from the slider 266 is completed through the auxiliary secondary windings, depending upon the position of the respectively associated relays, the primary of transformer 267 and ground so that alternately the circuit is completed either through the tap 263 or the lower end of the secondary winding 261, depending upon the position of the armature of the relay 262. A suitable servo 268 is energized by the transformer 267 and as in the previous embodiment a mechanical connection 269 is provided between the servo 268 and the slider 266 to move the slider to the null position every time one of the auxiliary windings is connected into or cut out of the circuit. In the latter embodiment the switch 262 corresponds to the relay 251a of the embodiment shown in Fig. 16; otherwise the operation is identical to the previous embodiment. The main advantage of the embodiment of Fig. 17 is that the 512-turn winding 251 of the previous embodiment is eliminated. In both the embodiments of Figs. 16 and 17, if the voltage across the main secondary winding is represented by $E_i'$, the output voltage $E_o'$ across the respective transformers 256 and 267 for any combination of switch positions will be $$E_o' = \frac{T \text{ (sum) } E}{T_t} \quad (2)$$

where T (sum) is equal to the total number of turns of the individual auxiliary windings which are connected into the circuit and $T_t$ is the total number of turns of all the windings.

Also in both embodiments it will be readily apparent that the number of turns in the respective windings can be different from that shown as long as the same ratio is maintained. However, it is not essential that the turns on the main windings be the exact sum of the turns on the auxiliary windings so long as it is at least equal to or greater than the total turns of the auxiliary windings.

The servomechanism indicated in this system may be of conventional construction and therefore no specific example is described. It will readily be recognized from the foregoing description that the final output from the translator unit is in discrete steps of quantities rather than a continuously varying quantity. Where greater accuracy is desired suitable smoothing, extrapolating or interpolating circuits could be used to provide an output which is substantially a continuous function.

From the foregoing description it will be readily apparent that the present invention provides a novel system for translating discrete points on one or more continuously varying functions into digital numbers which can be represented in terms of positions of mechanical elements, such as relays or their equivalents, and for translating this combination of positions into electrical quantities which are analogue representations of the digital numbers and thus the values of the discrete points on the function or functions.

What is claimed is:

1. An automatic programming system for coordinating a plurality of operations which may be expressed, respectively, as individual time functions any point of which may be expressed as an ordinate and an abscissa, comprising a translation device for expressing the magnitudes of the ordinates of discrete sequential points on the respective functions in terms of operative entities of preselected characteristics and time relations symbolizing digit places of digital numbers, said translation device comprising a plurality of units each adapted to store an operative entity corresponding to an individual digit place of a digital number representing a discrete point on one of the functions, utilization devices for giving effect, respectively, to each of the time functions, and means for selectively applying the operative entities in selected digital units at a selected instant to one of said utilization devices.

2. An automatic programming system for coordinating a plurality of simultaneous operations which may be expressed, respectively, as individual time functions comprising a signal discriminator and generating device having three separate outputs responsive to input signals of preselected different characteristics for generating three types of separate output pulses from the respective outputs, a digital stepping register connected to receive output signals from two of said outputs and comprising a plurality of multivibrator stages connected in tandem so that the states of conditions of the stages are progressively shifted from one stage to the next succeeding stage in response to signals received from the discriminator and generator means, each of said stages including a pair of multivibrator tubes the respective states of conditions of which represent the values of the respective digit places, the state in one of the tubes of each stage being determined by the signal from one of said outputs and the state in the other of the tubes of each stage being determined by a signal from the second of said outputs, a plurality of utilization devices, one corresponding to each of the time functions for translating the states of stages into operative entities which are functions of the respective time functions, a plurality of translating devices one operably associated respectively between one of said utilization devices and a preselected group of said stages, a channel selector for selectively operably associating said preselected group of stages simultaneously with one of the respective utilization devices, said channel selector being conjointly responsive to predetermined states of certain of said stages and a signal from the third output of said discriminator and generator means, and means for supplying signals to said discriminator and generator means representing chronologically closely associated discrete points on the respective time functions.

3. In an electrical system, means responsive to signal entities of different selected characteristics for producing time sequential pulses constituting digital permutation code groups representing respective analogue quantities, register means having a plurality of units responsive to said pulses for establishing coincident stable electrical states corresponding respectively, to a selected group of sequential pulses representing analogue quantities in terms of digits of a permutation code group in accordance with a selected permutation code and means for simultaneously reading out signal entities from said register means representing the stored digital permutation code information, in said plural means.

4. In a telemetering system means responsive to signal entities of different selected characteristics for producing time sequential pulses constituting digital permutation code groups representing respective analogue quantities, a digital stepping register having a plurality of trigger circuit stages connected in unclosed series chain, each stage having two stable states alternately assumed in response to time sequential signal entities, whereby certain of said stages are adapted to store analogue quantity information in terms of a digital permutation code represented by the relative disposition of the stages and their selected instantaneous coincident states, and means for deriving a utilization signal entity which is a predetermined function of the permutation code group represented by said coincident stable electrical states.

5. In a telemetering system means responsive to signal entities of different selected characteristics for producing time sequential pulses constituting digital permutation code groups representing respective analogue quantities, a digital stepping register having a plurality of trigger circuit stages connected in unclosed series chain, each stage having two stable states alternately assumed in response to time sequential signal entities, certain of said stages being adapted to store analogue quantity information in terms of a digital permutation code represented by the relative disposition of the stages and their selected instantaneous coincident states, other stages being adapted for storing address information, separate digital-to-analogue translation means connected to the respective outputs of each of said trigger circuit stages, said separate translation means being jointly responsive to the states of said utilization information stages and said address information stages for translating said digital utilization information to analogue information.

6. In a telemetering system means responsive to signal entities of different selected characteristics for producing time sequential pulses constituting digital permutation code groups representing respective analogue quantities, a digital stepping register having a plurality of trigger circuit stages connected in unclosed series chain relation for binary operation, each trigger circuit having two stable states alternately assumed in response to time sequential signal entities, said circuits being connected to assume the stable state of the next preceding circuit in response to one of said pulses so that the time sequential pulses cause progressive stepping of the states of said stages in the order received through said series chain so that when a selected number of signal entities corresponding to the number of trigger circuits have been received the relative positions of said stages and their respective states will represent a permutation code group convertible to an analogue quantity, respective translation means for each trigger circuit having such relative transfer characteristics in accordance with the selected digital permutation code as to convert said digital information to analogue information and means for reading out the instantaneous digital information in said stages to analogue information.

7. In a telemetering system for producing a stepped analogue time variant in accordance with time sequential signal entities constituting digital permutation code groups representing respective instantaneous magnitudes of said variant, a plurality of trigger circuits connected in series chain for binary operation, each trigger circuit having two stable states alternately assumed in response to time sequential signal entities of a digital permutation code group, said circuits in the series chain being adapted to assume the stable state of the next preceding circuit in response to an input signal entity whereby said series chain of trigger circuits is adapted to store sequential signal entities in the order received to constitute a digital permutation code group representing an instantaneous analogue magnitude of said analogue variant, and means for simultaneously translating the stored digital permutation code information to an analogue quantity.

8. In a telemetering system means for expressing the instantaneous analogue amplitude of a waveform as a group of time sequential signal entitles constituting a digital permutation code group, said signal entitles being of at least two distinguishable characteristics, a digital stepping register comprising a plurality of trigger circuit stages connected in an unclosed series chain, each trigger circuit stage having two stable states alternately assumed in response to time sequential signal entities so that signal entities entering one side of said chain will be progressively stepped through said chain in response to subsequent signal entities, said stages adapted to assume the stable states of the next preceding stage until triggered to an alternate state by a subsequent signal entity and means for simultaneously reading out the digital information stored in said stages to an analogue quantity.

9. In a telemetering system, a plurality of trigger circuits connected in series chain for binary operation, each trigger circuit having two stable states alternately assumed in response to time sequential signal entities of a digital permutation code group representing an analogue quantity, an output circuit for each trigger circuit, translation means for translating digital permutation codes to analogue quantities, a utilization circuit for receiving said analogue quantities, means for simultaneously and selectively interposing translation means between selected outputs of said trigger circuits and said utilization circuit.

10. In a telemetering system, a plurality of trigger circuits connected in series chain for binary operation, each trigger circuit having two stable states alternately assumed in response to time sequential entities of a digital permutation code group representing an analogue quantity, said circuits in the series chain being adapted to assume the stable state of the next preceding circuit in response to an input signal entity, an output for each of said permutation code trigger circuits, utilization circuits for receiving analogue signals corresponding to the respective digital code signal entities represented by the states of said trigger circuits, a plurality of translation means adapted to be selectively interposed between the respective outputs of said trigger circuits and said utilization circuits, and means responsive to subsequent signal entities for selectively interposing simultaneously certain of the respective translation means between selected trigger circuits and said utilization circuits to thereby derive an analogue signal entity which is a selected function of the original digitized analogue quantity.

11. In a telemetering system, a plurality of triggering circuits in series chain for binary operation, each trigger circuit having two stable states alternately assumed in response to time sequential groups of time sequential signal entities constituting a digital permutation code group, each group representing an analogue quantity, each trigger circuit adapted to store digital signal entities until triggered to the alternate state by a subsequent signal entity, an analogue storage device comprising a plurality of translation means adapted to be selectively connected to the respective outputs of said trigger circuits, a single utilization circuit connected to said plurality of translation means, and means for selectively energizing said translation means in accordance with the coincident states in said triggering circuits to derive an analogue signal entity corresponding to the respective time sequential code groups.

12. An automatic programming system for coordinating a plurality of simultaneous operations which may be expressed, respectively, as individual time functions, in which discrete points on the respective time functions are symbolized by signal entities of different selected characteristics constituting digital permutation code groups, each code group representing a respective discrete point on a time function, said system comprising a signal discriminator and generating device having an output channel for each time function to be controlled, said discriminator and generating device being responsive to input signal entities of preselected characteristics for generating binary digit and read out signal entities from the respective outputs, a digital stepping register comprising a plurality of trigger circuits connected in series chain for binary operation, each trigger circuit having two stable states alternately assumed in response to time sequential signal entities, said circuits in the series chain adapted to assume the state of the next preceding trigger circuit in response to an input signal entity whereby the state first assumed in the first of said trigger circuits is progressively stepped through the series chain so that when a selected number of signal entities corresponding to the number of trigger circuits in the chain have been received, the states of the trigger circuits will symbolize a digital permutation code group representing a discrete analogue quantity, the states of certain of said trigger circuits also designating a selected utilization circuit and means responsive to a signal entity of a third predetermined type for reading out the analogue value represented by the instantaneous states of said digital trigger circuits into a selected utilization circuit.

13. In a multi-channel communicator for coordinating a plurality of simultaneous operations which may be expressed, respectively, as separate time functions in which discrete points on the respective time functions are symbolized by signal entities of different selected characteristics constituting respective digital permutation code groups, each code group representing respective discrete points on a time function, said system comprising a plurality of trigger circuit stages connected in unclosed series chain, each stage having two stable states alternately assumed in response to time sequential signal entities and each stage adapted to assume the stable state of the next preceding stage in response to an input signal entity so that signal entities entering one side of said chain will be progressively stepped through said chain in response to sequential signal entities, said stages adapted to retain the stable state until triggered to an alternate state by a subsequent signal entity thereby storing digital information, means responsive to a subsequent signal entity for translating digital information as represented by the instantaneous states of said stages into respective analogue quantities in a selected one of a plurality of channels.

14. In a telemetering system means responsive to signal entities of different selected characteristics for producing time sequential pulses constituting a digital permutation code group representing an analogue quantity in accordance with a selected permutation code, means having a plurality of stages responsive to said pulses for establishing coincident stable electrical states corresponding, respectively, to the selected group of sequential pulses and other stages responsive to subsequent sequential pulses for establishing coincident states representing address information, and means jointly responsive to the states of said other stages and a subsequent signal entity for translating the permutation code group represented by the instantaneous states in said first group of stages into an analogue quantity in a selected one of a plurality of channels.

15. In a multi-channel communicator for telemetering simultaneously a plurality of analogue time variants, comprising a plurality of trigger circuit stages connected in an unclosed series chain for binary operation, each trigger circuit stage having two stable states alternately assumed in response to the sequential signal entities of a digital permutation code group representing an analogue quantity, said circuits in the series chain being adapted to assume the stable state of the next preceding circuit in response to an input signal so that signal entities entering one end of said chain will be stepped through said chain in response to sequential signal entities whereby time sequential permutation code groups representing respective analogue quantities of chronologically adjacent points on the respective time variants may be stepped across said chain in chronological sequence, an output for each of said stages, a utilization circuit for each of said time variants, respective translation means operatively associated between the outputs of said stages and each of the utilization circuits and switch means interposed between said output circuits and the respective utilization circuits, said switch means being selectively responsive to a signal entity for selectively and simultaneously connecting certain of said translation means between the outputs of certain of said stages and one of said utilization circuits for translating said coincident stable states of said stages into an analogue quantity in accordance with a selected permutation code.

16. In a telemetering system means responsive to signal entities of different selected characteristics for producing time sequential pulses constituting respective digital permutation code groups representing respective analogue quantities, plural means responsive to said pulses for establishing coincident stable electrical states, corresponding, respectively, to the digits of said code groups in accordance with a selected permutation code, a plurality of utilization devices, a circuit for each utilization device, translation means associated with each of said circuits selectively responsive to a selected signal entity for selectively translating the respective digital code group states into respective analogue quantities in a selected circuit for selectively energizing one of said utilization devices.

17. A multi-channel communicator for coordinating the simultaneous operation of a plurality of analogue devices including means for translating analogue quantities representing chronologically adjacent points on a plurality of respective time functions into signal entities constituting digital permutation code groups comprising, means for establishing a stable electrical state representing each digit, means for segregating signal entities representing the respective functions and translating said latter entities back into analogue quantities having the same chronological relation to each other as that between the original digitized analogue quantities.

18. A multi-channel communicator for transmitting signal entities representing a plurality of time functions over a single communication channel and reconstructing the original time functions in selected utilization circuits, comprising means for generating trains of time sequential signal entities, said trains being in the form of binary digital permutation code groups representing analogue values of chronologically adjacent instantaneous points on the respective functions and corresponding address signal entities, means for sequentially transmitting said signal entities, a stepping register having a number of trigger stages equal to the number of analogue and address binary digits for sequentially accepting said signal entities so that after the acceptance of a train of signal entities representing one instantaneous point and an address said stages will be in coincident stable states for storing the digital representations, means operably associated with each of said stages for selectively and jointly translating said analogue digital signal entities in accordance with said address digits.

19. In an information handling electrical system, means for transmitting and receiving time sequential signal entities representing a digital permutation code which is a function of information data, means including a plurality of units each responsive to said signal entities and arranged in a selected spatial configuration for selectively limiting the transfer of selected entities in space to thereby accept and store said entities for subsequent use and means responsive to a selected control signal for enabling the further transfer of said signal entities.

20. In an information handling electrical system, means for transmitting and receiving time sequential signal entities representing a digital permutation code which is a function of information data, means including a plurality of units each responsive to said signal entities and arranged in a selected spatial configuration for selectively limiting the transfer of selected entities in space to thereby accept and store said entities for subsequent use and means for reading out substantially simultaneously said signal entities from said units.

21. In an information handling electrical system, means for transmitting and receiving time sequential signal entities representing a digital permutation code which is a function of information data, means including a plurality of units each responsive to said signal entities and arranged in a selected spatial configuration for selectively limiting the transfer of selected entities in space to thereby accept and store said entities for subsequent use, said storage units being responsive to a command signal subsequent to said intelligence signal entities for enabling the further transfer of said signal entities and means for supplying a command signal comprising an aggregate of signal entities substantially simultaneously to said units.

22. In an information handling electrical system, means for transmitting and receiving time sequential signal entities representing a digital permutation code which is a function of information data, means including a plurality of units each responsive to said signal entities and arranged in a selected spatial configuration for selectively limiting the transfer of selected entities in space to thereby accept and store said entities for subsequent use, said storage units being responsive to a command signal for reading out signal entities stored in said units, means for supplying a command signal comprising an aggregate of signal entities simultaneously to said units, and means jointly responsive to the outputs of said units for providing an analogue representing said intelligence data.

23. In an information handling electrical system adapted to communicate information in the form of time sequential signal entities constituting a digital permutation code group, means for storing said signal entities in a fixed spatial relation to each other, said latter means having units responsive to the respective signal information entities arranged in a spatial configuration so related to the order and time spacing of said information entities so as to retain their original significance in the code group, said units being responsive to a command signal for reading out the signal entities in said storing means, and means for supplying a command signal having characteristics different from said signal entities to said units.

24. In an information handling electrical system, adapted to communicate information in the form of time sequential signal entities constituting digital permutation code groups, stepping register means having a plurality of units each responsive to an entity of said code group for establishing a stable electrical state corresponding to a respective entity and arranged in a spatial configuration so related to the order and time spacing of said entities as to retain a selected significance in the code groups, said units being responsive to a command signal for reading out said signal entities, and means for supplying a command signal to said units.

25. In a data processing electrical system, means for receiving and transmitting time sequential signal entities representing a digital permutation code which is a function of information data, stepping register means having a plurality of units each responsive to one of said entities for establishing coincidental electrical states and arranged in a selected spatial configuration so related to the order and time spacing of said information entities as to retain their original significance in the code groups, said units being responsive to a read-out signal for reading out the stored signal entities, and means for supplying a read-out signal to said units.

26. In a data processing electrical system, means for producing time sequential signal entities constituting digital permutation code groups representing respective information data, stepping register means including a plurality of units responsive to said entities for establishing coincident stable electrical states corresponding, respectively, to a selected group of said entities representing information data, additional register means including units for accepting and storing address signal entities, all of said units being responsive to a command or read-out signal for reading out signal entities, a plurality of output channels for selectively receiving the outputs of said units, and means jointly responsive to address signal entities and a read-out signal for reading out said information signal entities into an output channel corresponding to said address entities.

27. In an electrical system adapted to communicate intelligence represented by time sequential signal entities constituting digital permutation code groups representing respective intelligence data, register means having a plurality of units each responsive to one of said entities for establishing coincidental electrical states corresponding respectively to a selected group of said entities representing intelligence data and means responsive to a signal of selected characteristics and subsequent in time to all of the entities of the permutation code group representing intelligence data for simultaneously reading out said signal entities, means jointly responsive to the outputs of said units for providing an analogue for representing said intelligence data.

28. In a data processing system, means for receiving and transferring time sequential signal entities divided into blocks comprising digital permutation code groups, said groups representing respectively, information data, address and read-out signals, means having a plurality of units each responsive to one of said entities for establishing coincidental electrical states corresponding, respectively, to said signal entities, a plurality of output channels to receive selectively the outputs of said units, said units being arranged in a selected spatial configuration so related to the order and time spacing of said signal entities as to have their original significance in the code group when stepped into their final positions, all of said units being responsive to all of said signal entities, said units being so electrically related that said electrical states are stepped progressively from one side to the other of said second means in response to said sequential signal entities except the read-out signal, the latter causing read out of all of said signal entities into an output channel corresponding to a respective address entity.

29. In a data processing system, means for receiving and transferring time sequential signal entities divided into blocks comprising digital permutation code groups, said groups representing, respectively, information data, address and read-out signals, stepping register means having a plurality of units each responsive to one of said entities for establishing coincidental electrical states corresponding, respectively, to said signal entities, a plurality of output channels to receive selectively the outputs of said units, said units being arranged in a selected spatial configuration so related to the order and time spacing of said signal entities as to have their original significance in the code group when stepped into their final positions, all of said units being responsive to all of said signal entities, said units being so electrically related that said electrical states are stepped progressively from one side to the other of said register means in response to said sequential signal entities except the read-out signal, the latter causing read out of all of said signal entities into an output channel corresponding to said address entities, each of said output channels including means jointly responsive to said information signal entities for providing an analogue of said information data.

References Cited in the file of this patent

UNITED STATES PATENTS

| | | |
|---|---|---|
| 1,364,078 | Crehore | Jan. 4, 1921 |
| 1,587,122 | Harlow | June 1, 1926 |
| 1,600,204 | Alexanderson | Sept. 14, 1926 |

(Other references on following page)

United States Patents

| | | | |
|---|---|---|---|
| 1,637,080 | Kesses | July 26, | 1927 |
| 1,706,731 | Hammond, Jr. | Mar. 26, | 1929 |
| 1,890,877 | Haselton | Dec. 13, | 1932 |
| 1,946,531 | Haselton | Feb. 13, | 1934 |
| 1,992,945 | Haselton et al. | Mar. 5, | 1935 |
| 2,010,158 | Kleinschmidt | Aug. 6, | 1935 |
| 2,096,954 | Bellamy | Oct. 26, | 1937 |
| 2,124,906 | Bryce | July 26, | 1938 |
| 2,134,118 | Foss | Oct. 25, | 1938 |
| 2,168,460 | Watson | Aug. 8, | 1939 |
| 2,181,682 | Scheidegger | Nov. 28, | 1939 |
| 2,224,646 | Friedman et al. | Dec. 10, | 1940 |
| 2,295,000 | Morse | Sept. 8, | 1942 |
| 2,480,386 | Sherwood | Aug. 30, | 1949 |
| 2,492,134 | Cole | Dec. 27, | 1949 |
| 2,539,623 | Heising | Jan. 30, | 1951 |
| 2,549,422 | Carbrey | Apr. 17, | 1951 |
| 2,564,403 | May | Aug. 14, | 1951 |
| 2,575,017 | Hunt, Jr. | Nov. 13, | 1951 |
| 2,579,831 | Keinath | Dec. 25, | 1951 |
| 2,595,701 | Potter | May 6, | 1952 |
| 2,596,741 | Tyler et al. | May 13, | 1952 |
| 2,630,552 | Johnson | Mar. 3, | 1953 |
| 2,632,058 | Gray | Mar. 17, | 1953 |
| 2,658,139 | Abate | Nov. 3, | 1953 |
| 2,678,254 | Schenck | May 11, | 1954 |

Other References

Timing Control For PCM, Bell Laboratories Record, January 1949, pp. 10–15.